United States Patent
Ohzeki

(10) Patent No.: US 8,519,021 B2
(45) Date of Patent: Aug. 27, 2013

(54) INK SET FOR INK JET RECORDING AND INK JET RECORDING METHOD

(71) Applicant: FUJIFILM Corporation, Tokyo (JP)

(72) Inventor: Tomoyuki Ohzeki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/773,411

(22) Filed: Feb. 21, 2013

(65) Prior Publication Data

US 2013/0158177 A1    Jun. 20, 2013

Related U.S. Application Data

(63) Continuation of application No. 12/627,541, filed on Nov. 30, 2009.

(30) Foreign Application Priority Data

Dec. 26, 2008   (JP) ................................. 2008-334173

(51) Int. Cl.
*C09D 11/10* (2006.01)

(52) U.S. Cl.
USPC ........... 523/160; 524/268; 524/275; 524/276; 524/366

(58) Field of Classification Search
USPC ................. 523/160; 524/268, 275, 276, 366
See application file for complete search history.

(56) References Cited

U.S. PATENT DOCUMENTS

| | | | |
|---|---|---|---|
| 5,345,254 A | 9/1994 | Wong et al. | |
| 6,779,884 B1 * | 8/2004 | Ma et al. | 347/101 |
| 6,830,326 B2 | 12/2004 | Tsao et al. | |
| 7,291,363 B2 | 11/2007 | Miller | |
| 2004/0249018 A1 | 12/2004 | Kataoka et al. | |
| 2005/0131103 A1 | 6/2005 | Hassan et al. | |
| 2009/0246488 A1 | 10/2009 | Yanagi et al. | |
| 2010/0166962 A1 | 7/2010 | Ohzeki | |

FOREIGN PATENT DOCUMENTS

| | | |
|---|---|---|
| JP | 4-356570 A | 12/1992 |
| JP | 10-193775 A | 7/1998 |
| JP | 11-034478 A | 2/1999 |
| JP | 2000-301744 A | 10/2000 |
| JP | 2002-029140 A | 1/2002 |
| JP | 2002-80761 A | 3/2002 |
| JP | 2002-301857 A | 10/2002 |
| JP | 2004-284362 A | 10/2004 |

OTHER PUBLICATIONS

US Office Action dated Aug. 7, 2012, for U.S. Appl. No. 12/627,541.
US Office Action dated Nov. 21, 2012, for U.S. Appl. No. 12/627,541.
Notice of Reasons for Rejection dated Jan. 15, 2013 for Japanese Patent Application No. 2008-334713, with partial English translation.

* cited by examiner

*Primary Examiner* — Vu A Nguyen
(74) *Attorney, Agent, or Firm* — Birch, Stewart, Kolasch & Birch, LLP

(57) ABSTRACT

An ink set for ink jet recording containing an ink composition containing a pigment, polymer particles, a water-soluble organic solvent, a lubricant, and water and a reaction liquid that forms an aggregate by contacting with the ink composition and an ink jet recording method using the same are provided.

12 Claims, No Drawings

INK SET FOR INK JET RECORDING AND INK JET RECORDING METHOD

CROSS-REFERENCE TO RELATED APPLICATION

This application is a Continuation of co-pending application Ser. No. 12/627,541, filed on Nov. 30, 2009, which claims priority under 35 USC 119 from Japanese Patent Application No. 2008-334173 filed on Dec. 26, 2008, the entire contents of which are incorporated by reference herein.

BACKGROUND OF THE INVENTION

1. Field of the Invention

The present invention relates to an ink set for ink jet recording and an ink jet recording method.

2. Description of the Related Art

An ink jet recording method includes performing recording by ejecting an ink in the form of droplets from a large number of nozzles disposed at an ink jet head and has been widely used because high-quality images can be recorded on various recording media, etc.

For example, pigments are widely used in a coloring material as one component contained in ink materials. The pigments are dispersed in a medium, such as water, for use. When the pigments are dispersed for use, the particle diameter when dispersed, stability after dispersion, size uniformity, ejection properties from an ejection head, image density, etc., are important, and various studies on techniques for improving the same have been conducted.

On the other hand, when recording is performed on plain paper or the like, sufficient performance sometimes cannot be obtained with respect to, for example, scratch resistance (fixability) or resolution, in addition to the image density. In particular, this is the case when increasing the speed of ink jet recording, and a recording method more suitable for high speed recording using a single pass system capable of recording by one operation of a head, as opposed to a shuttle scanning system, is in demand.

As a technique relevant to the above, a system for printing an ink jet ink image having a first ink jet pen containing a pigment coloring agent and an ink jet ink containing colloid liquid containing a latex and a second ink jet pen containing a slip component that is constituted to cover the ink jet ink when the ink jet ink is ejected onto a substrate and a fixing agent composition containing a cationic polymer, a polyvalent salt and an organic acid is disclosed as a system giving dry rub resistance and improved dry rub transfer (see, e.g., Japanese Patent Application Laid-Open (JP-A) No. 2004-284362).

Moreover, a water-based recording ink containing a pigment, a water-soluble substance, and a resin or a wax is disclosed as an ink having excellent fixability (scratch resistance) (see, e.g., JP-A No. 04-356570).

Furthermore, a recording liquid containing a pigment, resin fine particles, and wax fine particles is disclosed as a recording liquid having excellent scratch resistance (see, e.g., JP-A No. 2002-301857).

Moreover, a recording liquid for ink printers containing a coloring material, two or more resin particles, and a wax is disclosed as a recording liquid for ink printers having no blur or penetration of the recording liquid and having excellent water resistance and ejection stability (see, e.g., JP-A No. 2002-80761).

In contrast, a recording liquid containing a color material and at least either one of a resin or a wax is disclosed as a recording liquid providing high-quality vivid color images with favorable reproducibility (see, e.g., JP-A No. 2000-301744).

However, in the technique disclosed in JP-A No. 2004-284362, a grade as printed matter is sometimes poor because the glossiness of paper is changed, the texture of glossy paper is sometimes impaired because ground glossiness is reduced, and the scratch resistance of images is sometimes poor. Moreover, in the techniques disclosed in JP-A Nos. 04-356570, 2002-301857, 2002-80761, and 2000-301744, the dot diameter of ejected ink droplets is large, and thus the quality of images is poor, and the scratch resistance of images is not sufficient in some cases.

SUMMARY OF THE INVENTION

The present invention has been made in view of the above circumstances and provides an ink set for ink jet recording and an ink jet recording method.

A first aspect of the present invention provides an ink set for ink jet recording including an ink composition containing a pigment, polymer particles, a water-soluble organic solvent, a lubricant, and water and a reaction liquid that forms an aggregate by contacting with the ink composition.

A second aspect of the present invention provides an ink jet recording method including an image formation process of forming an image on a recording medium using the ink set for ink jet recording of the first aspect of the present invention.

DETAILED DESCRIPTION OF THE INVENTION

The ink set for ink jet recording of the present invention contains an ink composition containing a pigment, polymer particles, a water-soluble organic solvent, a lubricant, and water and a reaction liquid that forms an aggregate by contacting with the ink composition.

The invention can provide an ink set for ink jet recording that suppresses paper deformation and can record images excellent in scratch resistance by constituting the ink set for ink jet recording as described above, particularly by using a reaction liquid in combination with an ink composition containing polymer particles and a lubricant.

<Ink Composition>

The ink composition in the invention contains a pigment, polymer particles, a water-soluble organic solvent, a lubricant, and water.

The ink composition in the invention can be constituted by further using a dispersant, a surfactant, and other components as required.

(Pigment)

The ink composition in the invention can contain at least one pigment as a color material, and the pigment can be contained as a pigment dispersion obtained by dispersing the pigment by a dispersant. It is preferable that the pigment be dispersed in a water based solvent. As the pigment, known pigments can be used.

In the invention, the pigment may be of any type, and any conventionally known organic and inorganic pigments may be used. Examples of the pigments include organic pigments such as azo lakes, azo pigments, polycyclic pigments such as phthalocyanine pigments, perylene and perinone pigments, anthraquinone pigments, quinacridone pigments, dioxazine pigments, diketopyrrolopyrrole pigments, thioindigo pigments, isoindolinone pigments, and quinophthalone pigments, dye lakes such as basic dye lakes and acidic dye lakes, nitro pigments, nitroso pigments, aniline black, and daylight fluorescent pigments; and inorganic pigments such as titanium oxide, iron oxide pigments, and carbon black pigments. Pigments that are not listed in the Color Index may also be used so long as they are capable of being dispersed in an aqueous phase. As a matter of course, a product produced by surface-treating the pigment with a surfactant, a polymer dispersant or the like, or graft carbon or the like may also be used. Among the pigments, in particular, azo pigments, phthalocyanine pigments, anthraquinone pigments, quinacridone pigments, or carbon black pigments are preferably used.

Specific examples of the organic pigment that may be used in the invention will be described below.

Examples of the organic pigment for orange or yellow include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 151, C.I. Pigment Yellow 155, C.I. Pigment Yellow 180 and C.I. Pigment Yellow 185.

Examples of the organic pigment for magenta or red include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222 and C.I. Pigment Violet 19.

Examples of the organic pigment for green or cyan include C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Green 7, and siloxane-crosslinked aluminum phthalocyanine described in U.S. Pat. No. 4,311,775.

Examples of the organic pigment for black include C.I. Pigment Black 1, C.I. Pigment Black 6 and C.I. Pigment Black 7.

(Dispersant)

The dispersant may be a polymer dispersant or a low molecular weight surfactant type dispersant. The polymer dispersant may be either one of a water-soluble dispersant or a water insoluble dispersant. Here, the water insoluble dispersant refers to a dispersant that dissolves in 100 g of water at 25° C. in an amount of 10 g or less after the dispersant is dried at 105° C. for 2 hours.

The low molecular weight surfactant type dispersant (hereinafter sometimes referred to as a "low molecular-weight dispersant") can be added for the purpose of stably dispersing the organic pigment in a water solvent while maintaining an ink at a low viscosity. The low molecular-weight dispersant mentioned here refers to a low molecular-weight dispersant having a molecular weight of 2,000 or lower. The molecular weight of the low molecular-weight dispersant is preferably from 100 to 2,000 and more preferably from 200 to 2,000.

The low molecular-weight dispersant has a structure containing a hydrophilic group and a hydrophobic group. At least one of each of the hydrophilic group and the hydrophobic group may be independently contained in one molecule, and the low molecular-weight dispersant may have plural hydrophilic groups and plural hydrophobic groups. The low molecular-weight dispersant can appropriately have a linking group for linking the hydrophilic group and the hydrophobic group.

The hydrophilic group may be an anionic group, a cationic group, a nonionic group, or a betaine type group having a combination thereof.

The anionic group is preferably a phosphate group, a phosphonate group, a phosphinate group, a sulfate group, a sulfonate group, a sulfinate group, or a carboxy group, more preferably a phosphate group or a carboxy group, further preferably a carboxy group, while it may be any group having a negative charge.

The cationic group is preferably an organic cationic substituent, more preferably a nitrogen- or phosphorus-containing cationic group, further preferably a nitrogen-containing cationic group, while it may be any group having a positive charge. In particular, the cationic group is preferably a pyridinium cation or an ammonium cation.

The nonionic group may be of any type, as long as it has neither a negative nor positive charge. For example, it may be part of polyalkylene oxide, polyglycerin or any sugar unit, or the like.

It is preferred in the invention that the hydrophilic group is an anionic group from the standpoints of dispersion stability and aggregation properties of a pigment.

When the low molecular-weight dispersant has an anionic hydrophilic group, its pKa is preferably 3 or more from the standpoint of accelerating an aggregation reaction when contacted with an acidic reaction liquid. The pKa of the low molecular-weight dispersant herein is a value experimentally obtained from a titration curve by titrating a liquid obtained by dissolving 1 mmol/L of a low molecular-weight dispersant in a tetrahydrofuran-water=3:2 (V/V) solution, with an acid or alkali aqueous solution.

Theoretically, when pKa of a low molecular-weight dispersant is 3 or more, 50% or more of anionic groups are in a non-dissociation state when contacted with a reaction liquid having a pH of about 3. Therefore, water solubility of the low molecular-weight dispersant is remarkably decreased, and an aggregation reaction occurs. In other words, aggregation reactivity is improved. From this standpoint, it is preferred that the low molecular-weight dispersant has a carboxy group as an anionic group.

The hydrophobic group may have any of a hydrocarbon structure, a fluorocarbon structure, a silicone structure, and so on. In particular, the hydrophobic group is preferably a hydrocarbon group. The hydrophobic group may be any of a straight chain structure and a branched chain structure. The hydrophobic group may form a single chain structure or two or more chain structures. When two or more chain structures are formed, the dispersant may have different hydrophobic groups.

The hydrophobic group is preferably a hydrocarbon group of 2 to 24 carbon atoms, more preferably a hydrocarbon group of 4 to 24 carbon atoms, and further preferably a hydrocarbon group of 6 to 20 carbon atoms.

Among the polymer dispersants, a hydrophilic polymer may be used as the water-soluble dispersant. Examples of a natural hydrophilic polymer include vegetable polymers such as gum Arabic, gum tragacanth, gum guar, gum karaya, locust bean gum, arabinogalactan, pectin and quince seed starch; seaweed polymers such as alginic acid, carrageenan and agar; animal polymers such as gelatin, casein, albumin and collagen; and microbial polymers such as xanthene gum and dextran.

Examples of a chemically modified hydrophilic polymer using a natural product as a raw material include cellulose polymers such as methyl cellulose, ethyl cellulose, hydroxyethyl cellulose, hydroxypropyl cellulose and carboxymethyl cellulose; starch polymers such as sodium starch glycolate and sodium starch phosphate; and seaweed polymers such as propylene glycol alginate.

Examples of a synthetic water-soluble polymer include vinyl polymers such as polyvinyl alcohol, polyvinyl pyrrolidone and polyvinyl methyl ether; acrylic resins such as polyacrylamide, polyacrylic acid or an alkali metal salt thereof, and water-soluble styrene acrylic resin; water-soluble styrene maleic acid resins; water-soluble vinylnaphthalene acrylic resins; water-soluble vinylnaphthalene maleic acid resins; polyvinyl pyrrolidone, polyvinyl alcohol, alkali metal salts of β-naphthalenesulfonic acid formalin condensate; and polymers having a salt of a cationic functional group such as quaternary ammonium or an amino group in a side chain thereof.

Among these, a polymer containing a carboxy group is preferred from the standpoints of dispersion stability and aggregation properties of pigment. Polymers containing a carboxy group, such as acrylic resins such as water-soluble styrene-acrylic resin; water-soluble styrene-maleic acid resin; water-soluble vinylnaphthalene-acrylic resin; and water-soluble vinylnaphthalene-maleic acid resin are particularly preferred.

Among the polymer dispersants, as a water-insoluble dispersant, a polymer having both a hydrophilic moiety and a hydrophobic moiety may be used. Examples of such a polymer include styrene-(meth)acrylic acid copolymer, styrene-(meth)acrylic acid-(meth)acrylic acid ester copolymer, (meth)acrylic acid ester-(meth)acrylic acid copolymer, polyethylene glycol (meth)acrylate-(meth)acrylic acid copolymer and styrene-maleic acid copolymer.

The polymer dispersant preferably has a weight average molecular weight of from 3,000 to 200,000, more preferably from 5,000 to 100,000, further preferably from 5,000 to 80,000, and particularly preferably from 10,000 to 60,000.

The mixing mass ratio of a pigment to a dispersant (pigment:dispersant) is preferably in a range of from 1:0.06 to 1:3, more preferably in a range of from 1:0.125 to 1:2, and further preferably in a range of from 1:0.125 to 1:1.5.

In the invention, dyes can be used as a color material insofar as the effects of the invention are not impaired. In such a case, dyes carried in water insoluble carriers can be used as water insoluble colored particles. As the dyes, known dyes can be used without particular limitation, and examples include dyes described in JP-A Nos. 2001-115066, 2001-335714, 2002-249677, etc. As the carriers, inorganic materials, organic materials, and composite materials thereof can be used without particular limitation insofar as they are insoluble or difficult to dissolve in water. Specifically, carriers described in JP-A Nos. 2001-181549, 2007-169418, etc., can also be preferably used in the invention.

The carrier carrying a dye (water insoluble colored particles) can be used as a water-based dispersion using a dispersant. As the dispersant, the dispersants mentioned above can be preferably used.

From the viewpoints of scratch resistance and aggregation properties, the pigment dispersant in the invention contains a pigment and a dispersant, but preferably contains an organic pigment and a polymer dispersant, and particularly preferably contains an organic pigment and a polymer dispersant containing a carboxy group.

Moreover, it is preferable that the pigments be covered with the polymer dispersant having a carboxy group and be water insoluble from the viewpoint of aggregation properties.

In the invention, it is preferable from the viewpoint of aggregation properties that the acid value of the self-dispersing polymers described later be lower than the acid value of the polymer dispersants.

The pigment preferably has an average particle diameter of from 10 nm to 200 nm, more preferably from 10 nm to 150 nm, and further preferably from 10 nm to 100 nm. When the average particle diameter is 200 nm or less, color reproducibility becomes better, and in the case of an inkjet method, droplet ejection properties become better. Furthermore, when the average particle diameter is 10 nm or more, light resistance becomes better.

The particle size distribution of the color material is not particularly limited, and may be any of wide particle size distribution and a monodispersed particle size distribution. A mixture of two or more kinds of pigments having a monodispersed particle size distribution may be used.

The average particle diameter and the particle diameter distribution of the polymer particles can be determined by measuring the volume average particle diameter by means of a dynamic light scattering method using a particle size distribution measuring apparatus NANOTRACKUPA-EX150 (trade name, manufactured by Nikkiso Co. Ltd.).

The pigments may be used alone or in a combination of two or more of them.

From the viewpoint of image density, the content of the pigment in the ink composition is preferably from 1% by mass to 25% by mass, more preferably from 2% by mass to 20% by mass, further preferably from 5% by mass to 20% by mass, and particularly preferably from 5% by mass to 15% by mass.

(Lubricant)

The ink composition of the invention contains at least one lubricant.

As the lubricant in the invention, any substance can be used without limitation insofar as it has a function of reducing the friction coefficient of the printed image surface. One or more substances selected from waxes, silicone compounds, ester compounds, fatty acid amide compounds (preferably a carboxylic acid amide compound), fluorine compounds, higher aliphatic acids or salts thereof, and organic or inorganic matting agents are preferable.

Examples of ester compounds include compounds described in each of JP-A Nos. 58-86540, 51-37217, 54-159221, 58-90633, 51-141623, etc.

As ester compounds other than the above, fatty acid esters are preferable. Examples of higher fatty acid esters include straight chain fatty acid esters, trimethylolpropane fatty acid ester, pentaerythritol fatty acid ester, and dipentaerythritol fatty acid ester.

Examples of silicone compounds include compounds described in each specification of JP-A Nos. 50-117414, 60-140341, 60-140342, 60-191240, and 59-4649, U.S. Pat. No. 4,404,276, German Pat. Nos. 2509534 and 1938959, etc.

Examples of carboxylic acid amide compounds include compounds described in JP-A No. 55-79435, etc.

Examples of fluorine compounds include compounds described in JP-A No. 63-19647, etc.

Examples of higher aliphatic acids or salts thereof include higher aliphatic acids or salts thereof described in the specification of British Pat. No. 1263722, etc.

Examples of the matting agent include inorganic and organic matting agents.

As organic matting agents, a vinyl polymer is preferable as a polymer. Examples include polymers containing polystyrene, polymethyl acrylate, polymethyl methacrylate, polyacrylonitrile, etc., as a main component. In particular, preferable examples of crosslinked polymer latexes include a styrene-divinylbenzene copolymer and poly(ethylene glycol dimethacrylate-co-methyl methacrylate).

The above-mentioned substances are commercially available and commercially available substances can be used.

M-1: Polyethylene particles, specific gravity: 0.90 (FLOW BEADS LE-1080, (trade name), produced by Sumitomo Seika Chemicals Co., Ltd.)

M-2: Polyethylene particles, specific gravity: 0.93 (FLOW BEADS EA-209, (trade name), produced by Sumitomo Seika Chemicals Co., Ltd.)

M-3: Polyethylene particles, specific gravity 0.96 (FLOW BEADS HE-3040, (trade name), produced by Sumitomo Seika Chemicals Co., Ltd.)

M-4: Silicone particles, specific gravity 0.97

M-5: Silicone particles, specific gravity 1.00 (E701, (trade name), manufactured by Toray Dow Silicone Co., Ltd.)

M-6: Silicone particles, specific gravity 1.03

M-7: Polystyrene particles, specific gravity 1.05 (SB-6, (trade name), manufactured by Sekisui Plastics Co., Ltd.)

M-8: Poly(St/MAA=97/3) copolymer particles, specific gravity 1.05

M-9: Poly(St/MAA=90/10) copolymer particles, specific gravity 1.06

M-10: Poly(St/MMA/MAA=50/40/10) copolymer particles, specific gravity 1.09

M-11: Crosslinked polyethylene particles, specific gravity 0.92

M-12: Crosslinked polyethylene particles, specific gravity 0.95

M-13: Crosslinked polyethylene particles, specific gravity 0.98

M-14: Crosslinked silicone particles, specific gravity 0.99

M-15: Crosslinked silicone particles, specific gravity 1.02

M-16: Crosslinked silicone particles, specific gravity 1.04

M-17: Poly(St/DVB=90/10) particles, specific gravity 1.06 (SX-713, (trade name), manufactured by Soken Chemical & Engineering Co., Ltd.)

M-18: Poly(St/DVB=80/20) particles, specific gravity 1.06 (SX-713, (trade name), manufactured by Soken Chemical & Engineering Co., Ltd.)

M-19: Poly(St/DVB=70/30) particles, specific gravity 1.07 (SX-713, (trade name), manufactured by Soken Chemical & Engineering)

M-20: Poly(St/MAA/DVB=87/3/10) copolymer particles, specific gravity 1.06 (SX-713α, (trade name), manufactured by Soken Chemical & Engineering Co., Ltd.)

M-21: Poly(St/MAA/DVB=80/10/10) copolymer particles, specific gravity 1.07 (SX-713α (trade name), manufactured by Soken Chemical & Engineering Co., Ltd.)

M-22: Poly(St/MMA/MAA/DVB=40/40/10/10) copolymer particles, specific gravity 1.10

Preferable example of the inorganic matting agents include silicon dioxide, titanium dioxide, magnesium dioxide, aluminum oxide, barium sulfate, calcium carbonate, silver chloride and silver bromide that have been desensitized by know methods, glass, and diatomaceous earth. Different kinds of substances can be mixed for use as required.

As the lubricant in the present invention, one or more members selected from straight chain higher fatty acid ester waxes, hydrocarbon waxes, silicone oil having a structure of —(—Si(CH$_3$)$_2$)$_n$—, in which n is an integer of 1 or more, 1-pentadecyl-2-hexadecyl-phthalic acid diester, and palmitic acid amide are preferable and waxes are more preferable, from the viewpoint of the improvement in scratch resistance.

Examples of the waxes include natural waxes and synthetic waxes.

Examples of natural waxes include petroleum waxes, plant waxes, and animal and plant waxes.

Examples of petroleum waxes include paraffin wax, microcrystalline wax, and petrolatum. Examples of plant waxes include carnauba wax, candelilla wax, rice wax, and Japan wax. Examples of animal and plant waxes include lanolin and beeswax.

Examples of synthetic waxes include synthetic hydrocarbon waxes and modified waxes.

Examples of synthetic hydrocarbon waxes include polyethylene wax and Fischer-Tropsch wax. Examples of modified waxes include paraffin wax derivatives, montan wax derivatives, and microcrystalline wax derivatives.

Among the waxes, the paraffin wax contains hydrocarbon having 20 to 40 carbon atoms as a main component, and is preferable in terms of excellent image glossiness, prevention of moisture evaporation from the nozzle end, and moisture retention effects.

The polyethylene wax is preferable in terms that the compatibility with a resin is excellent, and thus uniform and favorable images are easily formed. Since the polyethylene wax is easily modified, glycol modified polyethylene wax obtained by modifying the polyethylene wax is more preferable in terms that wettability originating from glycol can be given and wettability effects of the ink composition at the nozzle end are developed, and thus ejection stability can be made more effective.

It is preferable to use the lubricant in the invention with an emulsifying dispersant. The emulsifying dispersant for use in the invention can be selected from a large number of conventionally known emulsifying dispersants for use. A particularly preferable emulsifying dispersant in the invention is a dispersant represented by Formula (1).

$$(R^3)a\text{-}G\text{-}(D)d \qquad \text{Formula (1)}$$

In Formula (1), $R^3$ is a substituted or unsubstituted alkyl group, alkenyl group, aralkyl group, or aryl group having 10 to 60 carbon atoms; G represents a linking group having a valency of 2 to 7; D is (B)n-E, wherein B represents —CH$_2$CH$_2$O—, —CH$_2$CH$_2$CH$_2$O—, —CH(CH$_3$)CH$_2$O—, or —CH$_2$CH(OH)CH$_2$O—, and n is an integer of 1 to 50. Here, E represents hydrogen, or a substituted or unsubstituted alkylgroup, arylgroup, alkyl carbonyl group, or aryl carbonyl group having 1 to 8 carbon atoms; a and d each represent an integer of 1 to 6; plural $R^3$s, D, and E may be mutually the same or different.

Further detailed description will be given.

$R^3$ is a substituted or unsubstituted straight chain, branched, or cyclic alkyl group, alkenyl group, aralkyl group having 10 to 60 carbon atoms or a substituted or unsubstituted aryl group. Preferable examples of $R^3$ further include $C_gH_{2g+1}$ (wherein g represents an integer of 12 to 60), eicosyl, and docosanyl. Examples of the group represented by $R^3$ include dodecyl, myristyl, cetyl, stearyl, oleyl, eicosyl, docosasyl, triacontasyl, tetracontasyl, heptacontasyl, dinonylphenyl, didodecylphenyl, tetradecylphenyl, tripentylphenyl, and dodecylnaphthyl. D represents a polyoxyalkylene group of Formula —(B)$_n$-E. Here, B represents —CH$_2$CH$_2$O—, —CH$_2$CH$_2$CH$_2$O—, —CH(CH$_3$)CH$_2$O—, or —CH$_2$CH(OH)CH$_2$O—; and n represents an integer of from 1 to 50. B is preferably —CH$_2$CH$_2$O—; and n is preferably an integer of 5 to 30. E represents hydrogen or a substituted or unsubstituted alkyl group, aryl group, alkylcarbonyl group, or arylcarbonyl group having 1 to 8 carbon atoms. The alkyl group is preferably methyl, ethyl, propyl, butyl, hexyl, or cyclohexyl and particularly preferably methyl, ethyl, or propyl. The alkylcarbonyl group is preferably acetyl, propionyl, butyroyl, pivaloyl, or cyclohexanecarbonyl and particularly preferably acetyl. The aryl group is preferably a phenyl group. The arylcarbonyl group is preferably a benzoyl group. E is preferably hydrogen, methyl, ethyl, propyl, acetyl, propionyl, or benzoyl.

G represents a linking group having a valency of 2 to 7, preferably 2 to 5, more preferably 2 to 4, still more preferably 2 or 3. G preferably represents an alkylene group, an arylene group, or a composite group thereof. G may be a divalent substituted or unsubstituted linking group that is interposed by a heterogeneous atom such as oxygen, an ester group, sulfur, an amido group or a sulfonyl group. Among the above, oxygen, an ester group, and an amido group are particularly preferable. a and d each independently represent an integer of 1 to 6. The dispersant represented by Formula (1) preferably has a low solubility in an aqueous medium. For example, the solubility of the dispersant represented by Formula (1) in water is preferably 0.5% by mass or less (at 25° C.) and more preferably 0.1% by mass or less. Specific examples of the compound represented by Formula (1) are shown below, but the invention is not limited thereto.

WA-1
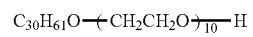

WA-2
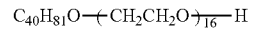

WA-3
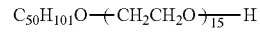

WA-4
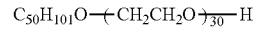

WA-5
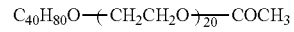

WA-6
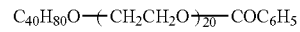

WA-7
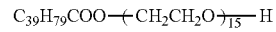

WA-8
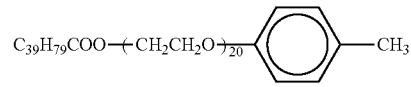

WA-9
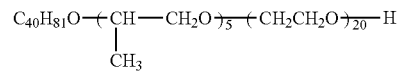

WA-10
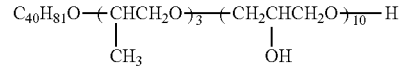

WA-11
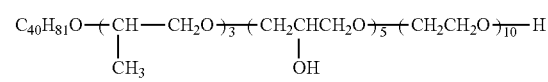

WA-12
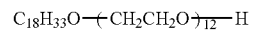

WA-13
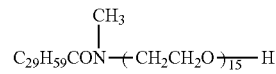

WA-14
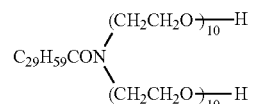

WA-15
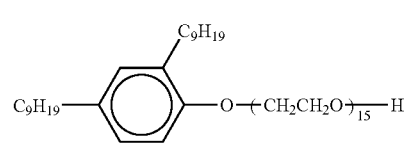

WA-16
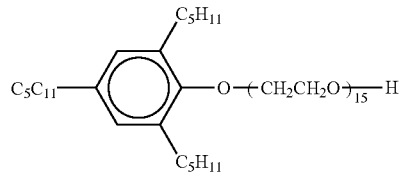

WA-17
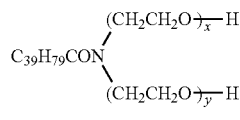

x + y = 20

WA-18
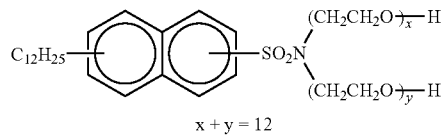

x + y = 12

WA-19
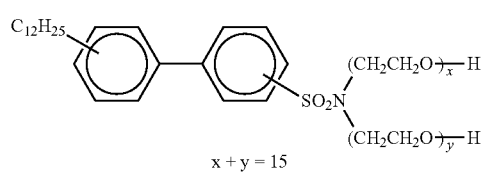

x + y = 15

The lubricant for use in the invention is preferably added in the form of a dispersion. The solvent is preferably water, and is not limited thereto. For example, usual organic solvents can be selected as appropriate and used at the time of dispersion. Examples thereof include ketones (e.g., acetone, methyl ethyl ketone, methyl isobutyl ketone, and cyclohexanone), alcohols (e.g., lower alcohols having 1 to 8 carbon atoms, such as methyl alcohol, ethyl alcohol, isopropyl alcohol, butyl alcohol, hexyl alcohol, and octyl alcohol), glycol derivatives (e.g., cellosolve, ethylene glycol diethyl ether, and propylene glycol monomethyl ether), lower fatty acid esters having 1 to 5 carbon atoms (e.g., ethyl acetate, butyl acetate, and ethyl propionate), haloalkanes (e.g., methylene dichloride, ethylene dichloride, trichlene, trichloromethane, trichloroethane, and carbon tetrachloride), hydrocarbons (e.g., octane, solvent naphtha, terpine oil, petroleum ether, thinner, petroleum benzine, benzene, toluene, and xylene), phenols (e.g., phenol and resorcinol), ethers (e.g., tetrahydrofuran and dioxane), phosphoric acid esters (e.g., trimethyl phosphate, triethyl phosphate, and tributyl phosphate), DMF as an amide-based compound, and DMSO. Alcohols, ketones, glycol derivatives, lower fatty acid esters, haloalkanes, and hydrocarbons are preferable. In particular, in a mixed solvent system containing water, a solvent selected from alcohols, ketones, or glycol derivatives that form a uniform solvent with water is preferable. When water is not used, a solvent selected from hydrocarbons, ketones, lower fatty acid esters, and haloalkanes is preferable.

Due to the above substances, the stability of a dispersion of the lubricant becomes excellent. The organic solvent mentioned above may be mixed with two or more of the same or different solvents for use.

Next, the lubricant dispersed particles for use in the invention will be described in more detail.

In the invention, in lubricant dispersed particles containing the lubricant and the dispersant represented by Formula (1), the constituent ratio of the lubricant and the dispersant is not particularly limited. It is preferable to use lubricant dispersed particles containing 25% by mass to 99% by mass of the lubricant and 1% by mass to 75% by mass of the dispersant. This is because, when the content of the lubricant is higher, the characteristics of the lubricant dispersed particles are more strongly developed in the outermost layer.

Accordingly, in the lubricant dispersed particles, it is preferable that the proportion of the dispersant represented by Formula (1) be lower.

It is preferable that, in the lubricant dispersed particles used in the invention, the lubricant and the dispersant be mixed at a temperature which is higher than any of the melting points of the lubricant and the dispersant prior to performing dispersion so that they are mixed in a molten state. Then, a solvent as a dispersion medium is similarly warmed to a high temperature, the molten mixture is added thereto, and then the mixture may be finely dispersed by various dispersing methods. It is also preferable that the warmed solvent be added to the molten mixture and then the mixture be dispersed and pulverized. The lubricant and the dispersant may be dissolved in a non-aqueous organic solvent that dissolves the lubricant or the dispersant, and then the obtained solution may be finely dispersed in water utilizing another water-soluble surfactant, and then the resultant may be added directly to the outermost layer as the lubricant dispersed particles. The non-aqueous organic solvent is preferably ethyl acetate, for example.

It is also useful to utilize the same as lubricant dispersed particles after removing the organic solvent after performing dispersion. An advantage in this case resides in that even when the melting point of the lubricant or the compound represented by Formula (1) is 100° C. or higher, the lubricant and the compound represented by Formula (1) can be dissolved and mixed in the organic solvent at a low temperature to form lubricant dispersed particles having a high melting point in a water system. Here, the melting points of the lubricant and the compound represented by Formula (1) are not particularly limited. As effective melting points, the melting points are preferably from 50° C. to 200° C., more preferably 60° C. or higher, and particularly preferably from 80° C. to 150° C. The solvent is most preferably water from the viewpoint that water is friendly to the environment in producing the ink composition of the invention. Accordingly, when a lubricant having a melting point of 80° C. is used, the temperature of water needs to be 80° C. or higher for performing dispersion.

The lubricant in the invention may be contained in a coating liquid in any form, such as in the form of a solution in which the lubricant is dissolved in an appropriate solvent, in the form of an emulsified dispersion, or in the form of a solid fine particle dispersion.

Well known examples of emulsifying and dispersing methods include a method including dissolving the lubricant using oil, such as dibutyl phthalate, tricresyl phosphate, dioctyl sebacate, or tri(2-ethylhexyl)phosphate, and an auxiliary solvent, such as ethyl acetate or cyclohexanone, and adding an emulsifying and dispersing agent to mechanically form an emulsified dispersion. In this method, it is preferable to add a polymer, such as an α-methylstyrene oligomer or poly(t-butylacrylamide) so as to adjust the viscosity or the refractive index of oil droplets.

Examples of methods for dispersing solid fine particles include a method including dispersing powder of the lubricant in an appropriate solvent, such as water, using a ball mill, a colloid mill, a vibration ball mill, a sand mill, a jet mill, a roller mill, or ultrasonic wave, and thereby producing a solid dispersion. In the method, a protective colloid (e.g. polyvinyl alcohol) or a surfactant (e.g., an anionic surfactant, such as sodium triisopropylnaphthalenesulfonate (mixture of substances in which the substitution positions of the three isopropyl groups are different from each other) may be used. In the above mills, beads made of zirconia or the like are commonly used as a dispersing medium. It is preferable to blend an antiseptic agent (e.g., a benzoisothiazolinone sodium salt) in a water-based dispersion.

An emulsifying and dispersing method is particularly preferable. It is preferable to add the lubricant in the form of fine particles having an average particle size of 0.01 µm to 10 µm, preferably 0.05 µm to 5 µm, and more preferably 0.1 µm to 2 µm.

With respect to the lubricant, the solid content of the lubricant in the ink composition is preferably 0.001% by mass to 20% by mass and more preferably 0.01% by mass to 10% by mass, in terms of the improvement in scratch resistance. The content thereof is still more preferably 0.1% by mass to 5% by mass.

(Polymer Particles)

The ink composition of the invention contains at least one kind of polymer particles. By containing polymer particles, stable ejection properties are obtained.

Examples of the polymer particle in the invention include particles of a resin having an anionic group. Examples of the resin having an anionic group include thermosetting, or modified acrylic, epoxy, polyurethane, polyether, polyamide, unsaturated polyester, phenolic, silicone, and fluorocarbon resins, polyvinyl type resins such as vinyl chloride, vinyl acetate, polyvinyl alcohol, and polyvinyl butyral resins, polyester resins such as alkyd resins and phthalic acid resins, amino type materials such as melamine resins, melamine formaldehyde resins, amino alkyd condensation resins, urea resins, and copolymers or mixtures thereof.

Among them, the anionic acrylic resin is obtained, for example, by polymerizing an acrylic monomer having an anionic group (an anionic group-containing acrylic monomer) and, if necessary, a monomer(s) copolymerizable with the anionic group-containing acrylic monomer in a solvent. Examples of the anionic group-containing acrylic monomer include acrylic monomers having at least one selected from the group consisting of a carboxy group, a sulfonic acid group, and a phosphonic group. Among them, acrylic monomers having a carboxy group (for example, acrylic acid, methacrylic acid, crotonic acid, ethacrylic acid, propylacrylic acid, isopropylacrylic acid, itaconic acid, fumaric acid, etc.) are preferred, and acrylic acid or methacrylic acid are particularly preferred.

As the polymer particles in the invention, self-dispersing polymer particles are preferred and self-dispersing polymer particles having a carboxy group is more preferred, from the viewpoints of the ejection stability and the liquid stability (particularly, dispersion stability) in the case of using a pigment. The self-dispersing polymer particles mean particles of a water-insoluble polymer which can form a dispersion state in an aqueous medium by means of a functional group (particularly, an acidic group or a salt thereof) of the polymer per se in the absence of other surfactant, and are water-insoluble polymer particles not containing a free emulsifier.

The dispersion state may be an emulsion state where the water-insoluble polymer is dispersed in a liquid state in an aqueous medium (emulsion) or a dispersion state where the water-insoluble polymer is dispersed in a solid state in an aqueous medium (suspension).

The water-insoluble polymer in the invention is preferably such a water-insoluble polymer that can form a dispersion state where the water-insoluble polymer is dispersed in a solid state, from the viewpoints of the aggregation rate and the fixabilityfixability when it is prepared as a liquid composition.

The dispersion state of the self-dispersing polymer particles in the invention means such a state where stable presence of a dispersion state can be observed visually at 25° C. for at least one week after mixing and stirring a solution in which 30 g of a water-insoluble polymer is dissolved into 70 g of an organic solvent (for example, methyl ethyl ketone), a neutralizerneutralizer capable of neutralizing salt-forming groups of the water-insoluble polymer to 100% (sodium hydroxide when the salt-forming groups are anionic, or acetic acid when the groups are cationic), and 200 g of water (apparatus: a stirrer equipped with a stirring blade, number of rotation: 200 rpm, 30 min, 25° C.), and then removing the organic solvent from the liquid mixture.

Further, the water-insoluble polymer means such a polymer showing an amount of dissolution of 10 g or less when the polymer is dried at 105° C. for 2 hr and then dissolved in 100 g of water at 25° C. The amount of dissolution is, preferably, 5 g or less and, more preferably, 1 g or less. The amount of dissolution is the amount of dissolution when the polymer is neutralized with sodium hydroxide or acetic acid to 100% in accordance with the kind of the salt-forming group of the water-insoluble polymer.

The aqueous medium includes water and, if necessary, may include a hydrophilic organic solvent. In the invention, the aqueous medium is preferably composed of water and 0.2% by mass or less of a hydrophilic organic solvent based on the amount of water, more preferably consists of water.

The main chain skeleton of the water-insoluble polymer is not particularly limited and, for example, a vinyl polymer or a condensation type polymer (epoxy resin, polyester, polyurethane, polyamide, cellulose, polyether, polyurea, polyimide, polycarbonate, etc.) can be used. Among them, the vinyl polymer is particularly preferred.

Preferred examples of the vinyl polymer and the monomer used for the vinyl polymer include those described in JP-A Nos. 2001-181549 and 2002-88294. Further, vinyl polymers in which a dissociative group is introduced to a terminal end of a polymer chain by radical polymerization of a vinyl monomer using a chain transfer agent, polymerization initiator, or an iniferter having a dissociative group (or a substituent that can be induced to the dissociative group) or by ionic polymerization using a compound having a dissociative group (or a substituent that can be induced to the dissociative group) to an initiator or a terminator can also be used.

Preferred examples of condensation type polymers and monomers used for the condensation type polymers include those described in JP-A No. 2001-247787.

The self-dispersing polymer particles preferably contain a water-insoluble polymer containing a hydrophilic constituent unit and a constituent unit derived from an aromatic group-containing monomer from the viewpoint of self-dispersibility.

The constituent unit of the hydrophilic group is not particularly limited insofar as it is derived from a hydrophilic group-containing monomer and may be derived from one hydrophilic group-containing monomer or two or more hydrophilic group-containing monomers. The hydrophilic group is not particularly limited, and may be a dissociative group or a nonionic hydrophilic group.

In the invention, the hydrophilic group is preferably a dissociative group and more preferably an anionic dissociable group from the viewpoints of promotion of self-dispersion and the stability of the formed emulsion state or dispersion state. Examples of the dissociative group include a carboxy group, a phosphate group, and a sulfonic acid group. Among the above, a carboxy group is preferable from the viewpoint of fixability when constituting an ink composition.

The hydrophilic group-containing monomer in the invention is preferably a dissociative group-containing monomer and, more preferably, a dissociative group-containing monomer having a dissociative group and an ethylenically unsaturated bond from the viewpoints of the self-dispersibility and the aggregation property.

Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-(methacryloyloxy)methyl succinate, etc. Specific examples of the unsaturated sulfonic acid monomer include styrenesulfonic acid, 2-acrylamido-2-methylpropane-sulfonic acid, 3-sulfopropyl (meth)acrylate, and bis(3-sulfopropyl) itaconate. Specific examples of the unsaturated phosphoric acid monomer include vinylphosphonic acid, vinyl phosphate, bis(methacryloyloxyethyl) phosphate, diphenyl-2-acryloyloxyethyl phosphate, diphenyl-2-methacryloyloxy-ethyl phosphate, and dibutyl-2-acryloyloxyethyl phosphate.

Among the dissociative group-containing monomers, an unsaturated carboxylic acid monomer is preferred, an acrylic monomer is more preferred and, acrylic acid and methacrylic acid are even more preferred from the viewpoints of dispersion stability and ejection stability.

The self-dispersing polymer particles in the invention preferably contain a polymer having a carboxy group and contain, more preferably, a polymer having a carboxy group and an acid value (mgKOH/g) of from 25 to 100, from the viewpoints of the self-dispersibility and the aggregation rate when the ink composition containing the polymer particles is in contact with a reaction liquid. The acid value is, more preferably, from 25 to 80 and, particularly preferably, from 30 to 65, from the viewpoints of the self-dispersibility and the aggregation rate when the ink composition containing the polymer particles is in contact with the reaction liquid.

Particularly, when the acid value is 25 or more, the stability of the self-dispersibility may be more favorable, and when the acid value is 100 or less, the aggregation property may be improved.

The aromatic group-containing monomer is not particularly limited so long as it is a compound containing an aromatic group and a polymerizable group. The aromatic group may be either a group derived from an aromatic hydrocarbon or a group derived from an aromatic heterocycle. In the invention, the aromatic group is preferably an aromatic group derived from an aromatic hydrocarbon, from the viewpoint of the shape stability of particles in an aqueous medium.

The polymerizable group may be either a polycondensating polymerizable group or an addition polymerizing polymerizable group. In the invention, the polymerizable group is preferably an addition polymerizing polymerizable group, and more preferably, a group containing an ethylenically unsaturated bond from the viewpoint of shape stability of particles in an aqueous medium.

The aromatic group-containing monomer preferably forms an acrylic resin containing a constituent unit derived from a (meth)acrylate monomer more preferably forms an acrylic resin containing a constituent unit derived from an aromatic group-containing (meth)acrylate monomer and is even more preferably a monomer having an aromatic group derived from an aromatic hydrocarbon and having an ethylenically unsaturated bond. The aromatic group-containing monomers may be used alone or in a combination of two or more of them.

Examples of the aromatic group-containing monomer include phenoxyethyl (meth)acrylate, benzyl (meth)acrylate, phenyl (meth)acrylate, and styrene type monomer. Among them, from the viewpoints of the balance between the hydrophilicity and the hydrophobicity of the polymer chain and the ink fixability, an aromatic group-containing (meth)acrylate monomer is preferred, and at least one selected from the group consisting of phenoxyethyl (meth)acrylate, benzyl (meth)acrylate, and phenyl (meth)acrylate is more preferred and, phenoxyethyl (meth)acrylate and benzyl (meth)acrylate are still more preferred.

"(Meth)acrylate" means acrylate or methacrylate,

The self-dispersing polymer particles in the invention preferably contain a constituent unit derived from an aromatic group-containing (meth)acrylate monomer and the content thereof is, preferably, from 10% by mass to 95% by mass. When the content of the aromatic group-containing (meth) acrylate monomer is from 10% by mass to 95% by mass, the stability of the self-emulsion state or dispersion state is improved and, further, increase in the viscosity of an ink can be suppressed.

In the invention, the content of the aromatic group-containing (meth)acrylate monomer is, more preferably, from 15% by mass to 90% by mass, further preferably, from 15% by mass to 80% by mass and, particularly preferably, from 25% by mass to 70% by mass from the viewpoint of the stability of the self-dispersion state, stabilization for the shape of the particles in the aqueous medium due to hydrophobic interaction between aromatic rings to each other, and lowering of the amount of the water-soluble component due to appropriate hydrophobization of the particles.

The self-dispersing polymer particles can be formed by using, for example, a constituent unit derived from an aromatic group-containing monomer and a constituent unit derived from a dissociative group-containing monomer. The polymer particles may further contain other constituent units if necessary.

Any monomer copolymerizable with the aromatic group-containing monomer and the dissociative group-containing monomer may be used to form the other constituent units. In particular, such a monomer is preferably an alkyl group-containing monomer from the viewpoint of polymer skeleton flexibility or easiness of glass transition temperature (Tg) control.

Examples of the alkyl group-containing monomer include (meth)acrylic ester monomers such as alkyl (meth)acrylates such as methyl (meth)acrylate, ethyl (meth)acrylate, isopropyl (meth)acrylate, n-propyl (meth)acrylate, n-butyl (meth) acrylate, isobutyl (meth)acrylate, tert-butyl (meth)acrylate, hexyl (meth)acrylate, and ethylhexyl (meth)acrylate, hydroxyl group-containing ethylenically unsaturated monomers such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth)acrylate, and dialkylaminoalkyl (meth) acrylate such as dimethylaminoethyl (meth)acrylate; and (meth)acrylamide monomers such as (meth)acrylamides such as N-hydroxyalkyl (meth)acrylamides such as N-hydroxymethyl (meth)acrylamide, N-hydroxyethyl (meth) acrylamide, and N-hydroxybutyl (meth)acrylamide, and N-alkoxyalkyl (meth)acrylamides such as N-methoxymethyl (meth)acrylamide, N-ethoxymethyl (meth)acrylamide, N-(n-, iso)butoxymethyl (meth)acrylamide, N-methoxyethyl (meth)acrylamide, N-ethoxyethyl (meth)acrylamide, and N-(n-, iso)butoxyethyl (meth)acrylamide.

A weight-average molecular weight of the water-insoluble polymer that is used in the self-dispersing polymer particles is, preferably, from 3,000 to 200,000 and, more preferably, from 5,000 to 150,000 and, further preferably, from 10,000 to 100,000. The amount of the water-soluble component can be suppressed effectively by defining the weight average molecular weight to 3,000 or more. Further, the self-dispersion stability can be increased by defining the weight average molecular weight to 200,000 or less.

The weight average molecular weight was measured by gel permeation chromatography (GPC). In GPC, HLC-8220GPC (trade name, manufactured by Tosoh Corporation) was used, and 3 pieces of columns, TSKgel Super HZM-H, TSKgel Super HZ4000, and TSKgel Super HZ 2000 connected in series (manufactured by Tosoh Corporation) were used as the column, and THF (tetrahydrofuran) was used as an eluate. Further, the measurement was performed by using an RI detector under the conditions at a sample concentration of 0.35% by mass, a flow rate of 0.35 mL/min, a sample ejection amount of 10 µL, and a measuring temperature of 40° C. A calibration curve was prepared based on eight samples of "standard sample TSK standard, polystyrene" of "F-40", "F-20", "F-4", "F-1", "A-5000", "A-2500", "A-1000", and "n-propylbenzene" manufactured by Tosoh Corporation.

The water-insoluble polymer used for the self-dispersing polymer particle in the invention preferably contains a structural unit derived from an aromatic group-containing (meth) acrylate monomer (preferably, a structural unit derived from phenoxyethyl (meth)acrylate and/or a structural unit derived from benzyl (meth)acrylate) at from 15% by mass to 95% by mass as the copolymerization ratio based on the entire mass of the self-dispersing polymer particles from the viewpoint of controlling the hydrophilicity and hydrophobicity of the polymer.

Further, the water-insoluble polymer preferably contains a constituent unit derived from an aromatic group-containing (meth)acrylate monomer at from 15% by mass to 80% by mass as the copolymerization ratio, a constituent unit derived from a carboxy group-containing monomer, and a constituent unit derived from an alkyl group-containing monomer (preferably, a constituent unit derived from (meth)acrylic acid alkyl ester). The water-insoluble polymer more preferably contains a structural unit derived from phenoxyethyl (meth) acrylate and/or a structural unit derived from benzyl (meth) acrylate at from 15% by mass to 80% by mass as the copolymerization ratio, a constituent unit derived from a carboxy group-containing monomer, and a constituent unit derived from an alkyl group-containing monomer (preferably, a structural unit derived from an ester of alkyl having 1 to 4 carbon atoms and (meth)acrylic acid). Further, the water-insoluble polymer has preferably an acid value of from 25 to 100 and a weight average molecular weight of from 3,000 to 200,000 and, more preferably, an acid value of from 25 to 95 and a weight average molecular weight of from 5,000 to 150,000, from the viewpoint of controlling the hydrophilicity and hydrophobicity of the polymer.

As specific examples of the water-insoluble polymer that is used in the self-dispersing polymer particle, exemplary compounds B-01 to B-19 are shown below but the invention is not limited to them. Numerical values described in each parenthesis represent the mass ratio of the copolymer components.

B-01: Phenoxyethyl acrylate/methyl methacrylate/acrylic acid copolymer (50/45/5)

B-02: Phenoxyethyl acrylate/benzyl methacrylate/isobutyl methacrylate/methacrylic acid copolymer (30/35/29/6)

B-03: Phenoxyethyl methacrylate/isobutyl methacrylate/ methacrylic acid copolymer (50/44/6)

B-04: Phenoxyethyl acrylate/methyl methacrylate/ethyl acrylate/acrylic acid copolymer (30/55/10/5)
B-05: Benzyl methacrylate/isobutyl methacrylate/methacrylic acid copolymer (35/59/6)
B-06: Styrene/phenoxyethyl acrylate/methyl methacrylate/acrylic acid copolymer (10/50/35/5)
B-07: Benzyl acrylate/methyl methacrylate/acrylic acid copolymer (55/40/5)
B-08: Phenoxyethyl methacrylate/benzyl acrylate/methacrylic acid copolymer (45/47/8)
B-09: Styrene/phenoxyethyl acrylate/butyl methacrylate/acrylic acid copolymer (5/48/40/7)
B-10: Benzyl methacrylate/isobutyl methacrylate/cyclohexyl methacrylate/methacrylic acid copolymer (35/30/30/5)
B-11: Phenoxyethyl acrylate/methyl methacrylate/butyl acrylate/methacrylic acid copolymer (12/50/30/8)
B-12: Benzyl acrylate/isobutyl methacrylate/acrylic acid copolymer (93/2/5)
B-13: Styrene/phenoxyethyl methacrylate/butyl acrylate/acrylic acid copolymer (50/5/20/25)
B-14: Styrene/butyl acrylate/acrylic acid copolymer (62/35/3)
B-15: Methyl methacrylate/phenoxyethyl acrylate/acrylic acid copolymer (45/51/4)
B-16: Methyl methacrylate/phenoxyethyl acrylate/acrylic acid copolymer (45/49/6)
B-17: Methyl methacrylate/phenoxyethyl acrylate/acrylic acid copolymer (45/48/7)
B-18: Methyl methacrylate/phenoxyethyl acrylate/acrylic acid copolymer (45/47/8)
B-19: Methyl methacrylate/phenoxyethyl acrylate/acrylic acid copolymer (45/45/10)

The method of producing a water-insoluble polymer that is used in the self-dispersing polymer particle is not particularly limited. Examples of the method of producing the water-insoluble polymer include a method of performing emulsion polymerization under the presence of a polymerizable surfactant thereby covalently-bonding the surfactant and the water-insoluble polymer and a method of copolymerizing a monomer mixture containing the hydrophilic group-containing monomer and the aromatic group-containing monomer by a known polymerization method such as a solution polymerization method or a bulk polymerization method. Among the polymerization methods described above, a solution polymerization method is preferred and a solution polymerization method of using an organic solvent is more preferred from the viewpoints of aggregation rate and the stability of droplet ejection when applied to an ink composition.

It is preferable, from the viewpoint of the aggregation rate, that the self-dispersing polymer particles in the invention contain a polymer synthesized in an organic solvent, the polymer have a carboxy group (preferably having an acid value of 25 to 100), the carboxy group of the polymer be partially or completely neutralized, and the self-dispersing polymer particles be prepared as particles prepared as a polymer dispersion containing water as a continuous phase. More specifically, it is preferable to produce the self-dispersing polymer particles by providing a process of synthesizing the polymer in an organic solvent and a process of forming a water-based dispersion in which the carboxy group of the polymer is at least partially neutralized.

The dispersion step preferably includes the following step (1) and step (2).

Step (1): step of stirring a mixture containing a polymer (water-insoluble polymer), an organic solvent, a neutralizer, and an aqueous medium, Step (2): step of removing the organic solvent from the mixture.

The step (1) is preferably a treatment that includes at first dissolving the polymer (water-insoluble polymer) in the organic solvent and then gradually adding the neutralizer and the aqueous medium, and mixing and stirring them to obtain a dispersion. By adding the neutralizer and the aqueous medium to the solution of the water-insoluble polymer dissolved in the organic solvent, self-dispersing polymer particles having a particle size that enables higher storage stability can be obtained without requiring strong sharing force.

The stirring method for the mixture is not particularly limited and a mixing and stirring apparatus that is used generally can be used, and if necessary, a disperser such as a ultrasonic disperser or a high pressure homogenizer can be used.

Preferable examples of the organic solvent include alcohol type solvents, ketone type solvents and ether type solvents.

Examples of the alcohol type solvent include isopropyl alcohol, n-butanol, t-butanol, and ethanol. Examples of the ketone type solvent include acetone, methyl ethyl ketone, diethyl ketone, and methyl isobutyl ketone. Examples of the ether type solvent include dibutyl ether and dioxane. Among the solvents, the ketone type solvent such as methyl ethyl ketone and the alcohol type solvent such as isopropyl alcohol are preferred. Further, with an aim of moderating the change of polarity at the phase transfer from an oil system to an aqueous system, combined use of isopropyl alcohol and methyl ethyl ketone is also preferred. By the combined use of the solvents, self-dispersing polymer particles of fine particle size with no aggregation settling or fusion between particles to each other and having high dispersion stability may be obtained.

The neutralizer is used to partially or completely neutralize the dissociative groups so that the self-dispersing polymer can form a stable emulsion state or dispersion state in water. In the case where the self-dispersing polymer of the invention has an anionic dissociative group (for example, a carboxy group) as the dissociative group, examples of the neutralizer to be used include basic compounds such as organic amine compounds, ammonia, and alkali metal hydroxides. Examples of the organic amine compounds include monomethylamine, dimethylamine, trimethylamine, monoethylamine, diethylamine, triethylamine, monopropylamine, dipropylamine, monoethanolamine, diethanolamine, triethanolamine, N,N-dimethylethanolamine, N,N-diethylethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and triisopropanolamine, etc. Examples of the alkali metal hydroxide include lithium hydroxide, sodium hydroxide and potassium hydroxide. Among them, sodium hydroxide, potassium hydroxide, triethylamine, and triethanolamine are preferred from the viewpoint of the stabilization of dispersion of the self-dispersing polymer particles of the invention into water.

The basic compound is used preferably in an amount of from 5 mol % to 120 mol % and, more preferably, by from 10 mol % to 110 mol % and, further preferably, by from 15 mol % to 100 mol % relative to 100 mol % of the dissociative groups. When the basic compound is used in an amount of 15 mol % or more, the effect of stabilizing the dispersion of the particles in water may be obtained and when the basic compound is used in an amount of 100 mol % or less, the effect of decreasing the water-soluble component may be provided.

In the step (2), an water-based dispersion of the self-dispersing polymer particles can be obtained by phase transfer to the aqueous phase by distilling off the organic solvent from the dispersion obtained in the step (1) by a common method such as distillation under a reduced pressure. In the obtained water-based dispersion, the organic solvent has been substantially removed and the amount of the organic solvent is preferably 0.2% by mass or less and, more preferably, 0.1% by mass or less.

The average particle diameter of the polymer particles (particularly, self-dispersing polymer particles) is, preferably, in a range from 10 nm to 400 nm, more preferably in a range from 10 nm to 200 nm, further preferably, in a range from 10 nm to 100 nm and, particularly preferably, in a range from 10 nm to 50 nm as the volume average particle diameter. The production adaptability may be improved when the average particle diameter is 10 nm or more. The storage stability may be improved when the average particle diameter is 400 nm or less. The particle diameter distribution of the polymer particles is not particularly limited and it may be either a wide particle diameter distribution or a monodispersed particle diameter distribution. Further, two or more types of water-insoluble particles may be used in admixture.

The average particle diameter and the particle diameter distribution of the polymer particles can be determined by measuring the volume average particle diameter by means of a dynamic light scattering method using a particle size distribution measuring apparatus NANOTRACK UPA-EX150 (trade name, manufactured by Nikkiso Co., Ltd.).

The glass transition temperature (Tg) of the polymer particles is preferably 20° C. to 200° C., more preferably 30° C. to 180° C., and still more preferably 40° C. to 170° C., from the viewpoint of the storage stability of the ink composition.

The content of the polymer particles (particularly, self-dispersing polymer particles) in the liquid composition is, preferably, from 1% by mass to 30% by mass and, more preferably, from 5% by mass to 15% by mass relative to the liquid composition, from the viewpoint of the glossiness of an image.

The polymer particles (particularly, self-dispersing polymer particles) can be used alone or two or more kinds of the polymer particles can be used in admixture.

(Water Soluble Organic Solvent)

The ink composition contains water as a solvent and also at least one water-soluble organic solvent. Since the ink composition contains the water-soluble organic solvent with the polymer particles, the minimum filming temperature of the polymer particles can be kept low in the ink composition, and ejection stability or the like can be kept favorable. In the invention, the water solubility means that 1% by mass or more of the organic solvent dissolves in water at 20° C.

Preferable examples of the water-soluble organic solvent constituting the ink composition include alkyleneoxy alcohol and alkyleneoxy alkyl ether from the viewpoint of curl of printed matter in a high humidity environment.

The alkyleneoxy alcohol is preferably a propyleneoxy alcohol. Examples of the propyleneoxy alcohol include SUN-NIX GP250 and SUNNIX GP400 (trade names, all manufactured by Sanyo Chemical Industries, Ltd.).

The alkyleneoxy alkyl ether is preferably an ethyleneoxyalkyl ether having an alkyl moiety of 1 to 4 carbon atoms or a propyleneoxyalkyl ether having an alkyl moiety of 1 to 4 carbon atoms. Examples of the alkyleneoxyalkyl ether include ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether.

In the invention, it is preferable that the polymer particles be self-dispersing polymer particles and that the water-soluble organic solvent be propyleneoxy alcohol and ethyleneoxy alkyl ether (the alkyl moiety thereof having 1 to 4 carbon atoms) and/or propyleneoxy alkyl ether (the alkyl moiety thereof having 1 to 4 carbon atoms). It is more preferable that the polymer particles be self-dispersing polymer particles containing a water insoluble polymer containing a water-soluble constituent unit and a constituent unit derived from an aromatic group-containing monomer and that the water-soluble organic solvent be propyleneoxy alcohol and ethyleneoxy alkyl ether (the alkyl moiety thereof having 1 to 4 carbon atoms) and/or propyleneoxy alkyl ether (the alkyl moiety thereof having 1 to 4 carbon atoms).

In addition to the water-soluble organic solvent, if necessary, any other organic solvent may be added for the purpose of preventing drying, accelerating penetration, controlling viscosity, or the like.

A certain organic solvent used as an anti-drying agent can be effectively prevent nozzle clogging, which could otherwise be caused by the ink dried in the ink ejection port in the process of ejecting the ink composition by an inkjet method for image recording.

For the prevention of drying, a water-soluble organic solvent having a vapor pressure lower than that of water is preferably used. Examples of the water-soluble organic solvent suitable for the prevention of drying include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane, heterocyclic compounds such as 2-pyrrolidone, N-methyl-2-pyrrolidone, 1,3-dimethyl-2-imidazolidinone, and N-ethylmorpholine, sulfur-containing compounds such as sulfolane, dimethylsulfoxide and 3-sulfolene, polyfunctional compounds such as diacetone alcohol and diethanolamine, and urea derivatives. In particular, polyhydric alcohols such as glycerin and diethylene glycol are preferred.

In order to accelerate the penetration, an organic solvent may be used for better penetration of the ink composition into recording media. Examples of the organic solvent suitable for penetration acceleration include alcohols such as ethanol, isopropanol, butanol, and 1,2-hexanediol, sodium lauryl sulfate, sodium oleate, and nonionic surfactants.

Besides the above, a water-soluble organic solvent may also be used to control viscosity. Examples of the water-soluble organic solvent that may be used to control viscosity include alcohols (e.g., methanol, ethanol and propanol), amines (e.g., ethanolamine, diethanolamine, triethanolamine, ethylenediamine, and diethylenetriamine), and other polar solvents (e.g., formamide, N,N-dimethylformamide, N,N-dimethylacetamide, dimethylsulfoxide, sulfolane, 2-pyrrolidone, acetonitrile, and acetone).

(Water)

The ink composition used in the invention includes water. There is no limitation on the content of water. The liquid composition may preferably contain water in an amount of 10% by mass to 99% by mass, more preferably from 30%% by mass to 80% by mass, and still more preferably 50% by mass to 70% by mass.

(Other Additives)

The ink composition may contain other additives as required, in addition to the components described above. Examples of other additives that may be used in the invention include conventional additives such as a color fading inhibitor, emulsion stabilizer, permeation accelerator, ultraviolet absorber, preservative, mildew-proofing agent, pH regulator, surface tension regulator, defoamer, viscosity adjusting agent, dispersant, dispersion stabilizer, anti-rust agent and chelating agent. These various additives may directly be added after preparation of the ink composition, or may be added at the time of preparation of the ink composition.

The ultraviolet absorber can improve storability of an image. Examples of the ultraviolet absorbers that may be used include the benzotriazole compounds described in JP-A Nos. 58-185677, 61-190537, 02-782, 05-197075, and 09-34057, the benzophenone compounds described in JP-A Nos. 46-2784 and 05-194483 and U.S. Pat. No. 3,214,463, the cinnamic acid compounds described in Japanese Patent Application Publication (JP-B) Nos. 48-30492 and 56-21141 and JP-A No. 10-88106, the triazine compounds described in JP-A Nos. 04-298503, 08-53427, 08-239368, and 10-182621, and Japanese National Phase Publication (Laid-Open) No. 08-501291, the compounds described in Research Disclosure No. 24239, and compounds capable of absorbing ultraviolet light and emitting fluorescence, so-called fluorescent whitening agents, such as stilbene compounds and benzoxazole compounds.

The color fading inhibitor can improve storability of an image. Various organic and metal-complex color fading inhibitors may be used. Organic color fading inhibitors include hydroquinones, alkoxyphenols, dialkoxyphenols, phenols, anilines, amines, indanes, chromans, alkoxyanilines, and heterocyclic compounds. Metal-complex color fading inhibitors include nickel complexes and zinc complexes. More specifically, examples of color fading inhibitors that may be used include the compounds described in items I to J of chapter VII of Research Disclosure No. 17643, Research Disclosure No. 15162, left column of page 650 of Research Disclosure No. 18716, page 527 of Research Disclosure No. 36544, page 872 of Research Disclosure No. 307105, and the patent literature cited in Research Disclosure No. 15162, and the compounds represented by the formulae for the typical compounds and included in the compound examples, in pages 127 to 137 of JP-A No. 62-215272.

Examples of the mildew-proofing agent include sodium dehydroacetate, sodium benzoate, pyridinethione-1-oxide sodium salt, ethyl p-hydroxybenzoate, 1,2-benzisothiazolin-3-one, and salts thereof. The ink composition preferably contains 0.02% by mass to 1.00% by mass of any of these agents.

A neutralizer (an organic base or an inorganic alkali) may be used as the pH regulator. In order to improve the storage stability of the ink composition, the pH regulator is preferably added so that the ink composition can have a pH of from 6 to 10, more preferably from 7 to 10.

Examples of the surface tension regulator include nonionic surfactants, cationic surfactants, anionic surfactants, and betaine type surfactants.

For smooth ejection in ink jet methods, the amount of addition of the surface tension regulator is preferably such that the surface tension of the ink composition can be adjusted in the range of from 20 mN/m to 60 mN/m, more preferably from 20 mN/m to 45 mN/m, further preferably from 25 mN/m to 40 mN/m. When the ink is applied by methods other than ink jet methods, the amount of addition of the surface tension regulator is preferably such that the surface tension of the ink composition can be adjusted in the range of from 20 mN/m to 60 mN/m, more preferably from 30 mN/m to 50 mN/m.

The surface tension of the ink composition may be measured by a plate method using Automatic Surface Tensiometer CBVP-Z (trade name, manufactured by Kyowa Interface Science Co., LTD.) under 25° C. conditions.

Preferred examples of the surfactant include hydrocarbon anionic surfactants such as fatty acid salts, alkyl sulfate ester salts, alkyl benzenesulfonates, alkyl naphthalenesulfonates, dialkyl sulfosuccinates, alkyl phosphate ester salts, naphthalenesulfonic acid-formalin condensates, and polyoxyethylene alkyl sulfate ester salts; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerin fatty acid esters, and oxyethylene-oxypropylene block copolymers. Acetylene polyoxyethylene oxide surfactants SURFYNOLs (trade name, manufactured by Air Products & Chemicals, Inc.) are also preferably used. Amine oxide type amphoteric surfactants such as N,N-dimethyl-N-alkylamine oxide are also preferred.

In addition, the surfactants listed in pages 37 to 38 of JP-A No. 59-157636 and Research Disclosure No. 308119 (1989) may also be used.

Fluorocarbon (alkyl fluoride type) surfactants or silicone surfactants as described in JP-A Nos. 2003-322926, 2004-325707 and 2004-309806 may be used to improve scratch resistance.

The surface tension regulator may also be used as a defoamer, and fluorine compounds, silicone compounds, and chelating agents such as EDTA may also be used.

When the ink composition is ejected and applied by ink jet methods, the viscosity of the ink composition is preferably in the range of from 1 mPa·s to 30 mPa·s, more preferably from 1 mPa·s to 20 mPa·s, further preferably from 2 mPa·s to 15 mPa·s, and particularly preferably from 2 mPa·s to 10 mPa·s, from the viewpoints of ejection stability and the aggregation rate upon contact between the ink composition and the reaction liquid. When the ink composition is applied by methods other than ink jet methods, the viscosity of the ink composition is preferably in the range of from 1 mPa·s to 40 mPa·s, and more preferably from 5 mPa·s to 20 mPa·s.

For example, the viscosity of the ink composition may be measured using a Brookfield viscometer.

<Reaction Liquid>

The reaction liquid in the invention is constituted in such a manner as to form an aggregate by contacting with the ink composition previously described above. Specifically, it is preferable for the reaction liquid to contain an aggregating component capable of forming an aggregate by aggregating dispersed particles, such as color material particles (pigment or the like) in the ink composition. The reaction liquid can be constituted by using other components, as required. By the use of the reaction liquid with the ink composition, ink jet recording can be carried out at a high speed, and even in the case of high-speed recording, images excellent in drawing properties with a high density and high resolution (e.g., reproducibility of thin lines or fine portions) are obtained.

(Aggregating Component)

The reaction liquid can contain at least one aggregating component capable of forming an aggregate by contacting with the ink composition. When the reaction liquid is mixed with the ink composition ejected by an ink jet method, the aggregation of the pigment or the like stably dispersed in the ink composition is accelerated.

Examples of the reaction liquid include a liquid capable of forming an aggregate by changing the pH of the ink composition. The pH of the reaction liquid (at 25° C.±1° C.) is, preferably, from 1 to 6, more preferably, from 1.2 to 5 and, further preferably, from 1.5 to 4, from the viewpoint of the aggregation rate of the ink composition. In this case, the pH of the ink composition (at 25° C.±1° C.) used in the ejection step is, preferably, from 7.5 to 9.5 (more preferably, from 8 to 9.0).

Among all, in the invention, it is preferred that the pH of the ink composition (at 25° C.) is 7.5 to 9.5 and the pH of the reaction liquid (at 25° C.) is preferably from 1.5 to 3, from the viewpoint of the image density, the resolution and increase in the ink jet recording speed.

The aggregating component can be used alone or two or more of the components can be used in admixture.

The reaction liquid may be prepared using at least one acidic compound as the aggregating component. Acidic compounds that may be used include compounds having a phosphate group, a phosphonate group, a phosphinate group, a sulfate group, a sulfonate group, a sulfonate group, or a carboxy group, or salts thereof (such as polyvalent metal salts). Particularly, in view of the aggregation rate of the ink composition, compounds having a phosphate group or a carboxy group are more preferred, and compounds having a carboxy group are further preferred.

The carboxy group-containing compound is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, ortho-phosphoric acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, derivatives of these compounds, or salts thereof (such as polyvalent metal salts). These compounds may be used alone or in a combination of two or more of them.

The reaction liquid in the invention can be constituted further including a water based solvent (e.g., water) in addition to the acidic compound and the like.

The content of the acidic compound in the reaction liquid is preferably 5% by mass to 95% by mass, more preferably 10% by mass to 80% by mass, still more preferably 15% by mass to 50% by mass, and particularly preferably 18% by mass to 30%, based on the total mass of the reaction liquid from the viewpoint of the aggregation effect.

Preferred examples of the reaction liquid that may improve the high speed aggregation property include a reaction liquid including a polyvalent metal salt or a polyallylamine. Examples of the polyvalent metal salt and a polyallylamine include salts of alkaline earth metals belonging to group 2 of the periodic table (for example, magnesium and calcium), salts of a transition metal belonging to group 3 of the periodic table (for example, lanthanum), salts of a cation of a metal belonging to group 13 of the periodic table (for example, aluminum), salts of a lanthanide (for example, neodium), polyallylamine and polyallylamine derivatives. As the metal salts, carboxylic acid salts (such as, salts of formic acid, salts of acetic acid, and salts of benzoic acid), nitric acid salts, chlorides, and thiocyanic acid salts are preferred, and calcium salt or magnesium salt of a carboxylic acid (such as salts of formic acid, salts of acetic acid, and salts of benzoic acid), calcium salt of nitric acid or magnesium salt of nitric acid, calcium chloride, magnesium chloride, and calcium salt of thiocyanic acid or magnesium salt of thiocyanic acid are more preferred.

The content of a salt of the metal salt in the reaction liquid is preferably 1% by mass to 10% by mass, more preferably 1.5% by mass to 7% by mass, and still more preferably 2% by mass to 6% by mass, from the viewpoint of the aggregation effect.

The reaction liquid may be prepared using at least one cationic organic compound as the aggregating component. Examples of the cationic organic compound include cationic polymers such as poly(vinylpyridine) salts, polyalkylaminoethyl acrylate, polyaklylaminoethyl methacrylate, poly(vinylimidazole), polyethyleneimine, polybiguanide, polyguanide, and polyallyamine, and derivatives thereof.

As the weight average molecular weight of the cationic polymer, the molecular weight is preferably lower from the viewpoint of the viscosity of the reaction liquid. When the reaction liquid is applied on a recording medium by an ink jet system, the weight average molecular weight thereof is preferably in the range of 1,000 to 500,000, more preferably in the range of 1,500 to 200,000, and still more preferably in the range of 2,000 to 100,000. The weight average molecular weight of 1000 or more is advantageous from the viewpoint of an aggregation rate and the weight average molecular weight of 500,000 or lower is advantageous in terms of ejection reliability. However, when the reaction liquid is applied on a recording medium by methods other than the ink jet method, the weight average molecular weight of the reaction liquid is not limited to the above.

The cationic organic compound is also preferably a primary, secondary or tertiary amine salt type compound. Examples of such an amine salt type compound include cationic compounds such as hydrochlorides or acetates of compounds (e.g., laurylamine, coconut amine, stearylamine, and rosin amine), quaternary ammonium salt type compounds (e.g., lauryltrimethylammonium chloride, cetyltrimethylammonium chloride, lauryldimethylbenzylammonium chloride, benzyltributylammonium chloride, and benzalkonium chloride), pyridinium salt type compounds (e.g., cetylpyridinium chloride and cetylpyridinium bromide), imidazoline type cationic compounds (e.g., 2-heptadecenyl-hydroxyethylimidazoline), higher alkylamine ethylene oxide adducts (e.g., dihydroxyethylstearylamine); and amphoteric surfactants capable of being cationic in the desired pH range, such as amino acid type amphoteric surfactants, R—NH—$CH_2CH_2$—COOH type compounds, carboxylate type amphoteric surfactants (e.g., stearyl dimethyl betaine and lauryl dihydroxyethyl betaine), and sulfate type, sulfonic acid type, or phosphate type amphoteric surfactants.

In particular, cationic organic compounds having a valency of 2 or more are preferred.

The content of the cationic organic compound in the reaction liquid is preferably 1% by mass to 50% by mass and more preferably 2% by mass to 30% by mass from the viewpoint of aggregation effects.

Among the above, preferable examples of the aggregating component include carboxylic acids having a valency of 2 or more or cationic organic compounds having a valency of 2 or more, from the viewpoints of aggregation properties and scratch resistance of images.

From the viewpoint of the aggregation rate of the ink composition, the viscosity of the reaction liquid is preferably in the range of from 1 mPa·s to 30 mPa·s, more preferably from 1 mPa·s to 20 mPa·s, further preferably from 2 mPa·s to 15 mPa·s, and particularly preferably from 2 mPa·s to 10 mPa·s. The viscosity may be measured using VISCOMETER TV-22 (trade name, manufactured by TOKI SANGYO CO., LTD.) under 20° C. conditions.

From the viewpoint of the aggregation rate of the ink composition, the surface tension of the reaction liquid is preferably from 20 mN/m to 60 mN/m, more preferably from 20 mN/m to 45 mN/m, and further preferably from 25 mN/m to 40 mN/m. The surface tension may be measured using Automatic Surface Tensiometer CBVP-Z (trade name, manufactured by Kyowa Interface Science Co., LTD.) under 25° C. conditions.

(Other Components)

In the invention, the reaction liquid may generally contain a water-soluble organic solvent in addition to the aggregating component. The reaction liquid may also be prepared using other various additives, as long as the effects of the invention are not impaired. The details of the water-soluble organic solvent may be the same as those described above for the ink composition.

Examples of the other additives include conventional additives such as anti-drying agent (moistening agent), a color fading inhibitor, emulsion stabilizer, permeation accelerator, ultraviolet absorber, preservative, mildew-proofing agent, pH regulator, surface tension regulator, defoamer, viscosity adjusting agent, dispersant, dispersion stabilizer, anti-rust agent, and chelating agent. The examples listed above for the other additives contained in the ink composition may also be used.

<Ink Jet Recording Method>

The ink jet recording method of the invention is an ink jet image recording method including an image formation process of forming an image on a recording medium using the ink set for ink jet recording described above.

In an exemplary embodiment, the ink jet recording method of the invention includes a drying process of drying the image after the image formation process and a heat-fixing process of fixing the image by bringing the image surface into contact with a heating member after drying.

In another exemplary embodiment, the image formation process includes a reaction liquid applying process of applying a reaction liquid onto the recording medium and an aggregate formation process of forming an aggregate by applying the ink composition on the reaction liquid applied onto the recording medium.

The ink jet recording method of the invention can contain other processes as required.

When the ink jet recording method of the invention is constituted to employ an ink set for ink jet recording containing the ink composition, particularly an ink set for ink jet recording containing an ink composition containing polymer particles and a lubricant and the reaction liquid, an ink jet recording method capable of forming images excellent in scratch resistance can be obtained.

Hereinafter, each process constituting the ink jet recording method of the invention will be described.

[Image Formation Process]

The image formation process in the invention is a process of forming an image on a recording medium using an ink set for ink jet recording and includes at least a reaction liquid applying process of applying a reaction liquid onto the recording medium and an aggregate formation process of forming an aggregate by applying the ink composition on the reaction liquid applied on the recording medium.

Reaction Liquid Applying Process

The reaction liquid applying process is a process of applying a reaction liquid, which is capable of forming an aggregate by contacting with an ink composition, on a recording medium. The reaction liquid is brought into contact with the ink composition to thereby form an image. In this case, dispersed particles such as polymer particles or particles of color material (for example, pigment) in the ink composition are aggregated, whereby an image is fixed on the recording medium. The details of each component in the reaction liquid and preferable embodiments are as described above.

The reaction liquid can be applied by a known method, such as a coating method, an ink jet method, or a dip coating method. The coating method can be carried out using a known coating method employing a bar coater, an extrusion die coater, an air doctor coater, a bread coater, a rod coater, a knife coater, a squeeze coater, a reverse roll coater, or the like. The details of the ink jet method are as described above.

The reaction liquid applying process may be provided before or after the aggregate formation process using an ink composition.

In the invention, an embodiment in which the aggregate formation process is provided after applying a reaction liquid in the reaction liquid applying process is preferable. More specifically, an embodiment in which a reaction liquid for aggregating a color material (preferably a pigment) in an ink composition is applied on a recording medium in advance before applying the ink composition, and the ink composition is supplied in such a manner as to contact with the reaction liquid applied on the recording medium to thereby form an image is preferable. Thus, an ink jet recording speed can be increased, and even in the case of high speed recording, images with high density and high resolution are obtained.

The amount of application of the reaction liquid is preferably such that the aggregating component (e.g., a carboxylic acid having a valency of two or more or a cationic organic compound having a valency of two or more) can be applied in an amount of 0.1 $g/m^2$ or more, while it is not particularly limited as long as the ink composition can be aggregated. In particular, the aggregating component is preferably applied in an amount of from 0.1 $g/m^2$ to 1.0 $g/m^2$, more preferably from 0.2 $g/m^2$ to 0.8 $g/m^2$. When the amount of application of the aggregating component is 0.1 $g/m^2$ or more, the aggregation reaction can proceed well. When it is 1.0 $g/m^2$ or less, the glossiness will not become too high, which is preferred.

In the invention, it is preferable to provide the aggregate formation process after the reaction liquid applying process and further provide a drying by heating process of drying by heating the reaction liquid onto the recording medium after applying the reaction liquid on the recording medium but before applying the ink composition. When the reaction liquid is dried by heating in advance before the aggregate formation process, ink coloring properties, such as prevention of blur, become favorable, and thus visible images having a favorable color density and a favorable hue can be recorded.

The drying by heating is carried out by known heating measures, such as a heater, or known air blowing measures, such as a dryer, or by using the measures in combination. Examples of heating methods include a method for supplying heat with a heater or the like from the surface of the recording medium onto which the reaction liquid is applied and the opposite side, a method for applying warmed air or hot air to the surface of the recording medium onto which the reaction liquid is applied, and a heating method using an infrared heater or the like. The heating methods may be used in combination for heating.

—Aggregate Formation Process—

The aggregate formation process is a process of applying the ink composition of the invention described above onto a recording medium by an ink jet method. In this process, the ink composition can be selectively applied on a recording medium, and desired visible images can be formed. The details of each component in the ink composition of the invention and preferable embodiments are as described above.

Image recording utilizing the ink-jet method can be performed, specifically, by supplying energy thereby ejecting a liquid composition to a desired recording medium, that is, plain paper, resin-coated paper, paper used exclusively for ink-jet recording described, for example, in JP-A Nos.

8-169172, 8-27693, 2-276670, 7-276789, 9-323475, 62-238783, 10-153989, 10-217473, 10-235995, 10-337947, 10-217597, and 10-337947, films, common use paper for electrophotography, clothes, glass, metals, ceramics, etc. As the ink-jet recording method suitable to the invention, a method described in JP-A No. 2003-306623, in columns (0093) to (0105) may be applicable.

The ink-jet method is not particularly limited and may be of any known system, for example, a charge control system of ejecting an ink utilizing an electrostatic attraction force, a drop on demand system of utilizing a vibration pressure of a piezo element (pressure pulse system), an acoustic ink-jet system of converting electric signals into acoustic beams, irradiating them to an ink, and ejecting the ink utilizing a radiation pressure, and a thermal ink-jet system of heating an ink to form bubbles and utilizing the resulting pressure (BUBBLEJET (registered trade mark)). As the ink-jet method, an ink-jet method described in JP-A No. 54-59936 of causing abrupt volume change to an ink that undergoes the action of thermal energy, and ejecting the ink from a nozzle by an operation force due to the change of state can be utilized effectively.

Examples of the ink-jet method include a system of jetting a number of ink droplets of low concentration, a so-called "photo-ink" each in a small volume, a system of improving an image quality using plural inks of a substantially identical hue and of different concentrations, and a system of using a colorless and transparent ink.

The ink-jet head used in the ink-jet method may be either an on-demand system or a continuous system. The ejection system includes, specifically, for example, an electric-mechanical conversion system (for example, single cavity type, double cavity type, vender type, piston type, share mode type, shared wall type, etc.), an electric-thermal conversion system (for example, thermal ink-jet type, BUBBLEJET (registered trade mark) type, etc.), an electrostatic suction system (for example, electric field control type, slit jet type, etc.), and an electric discharge system (for example, spark jet type, etc.) and any of the ejection systems may be used.

Ink nozzles, etc. used for recording by the ink-jet method are not particularly limited but can be selected properly depending on the purpose.

Examples of ink-jet recording methods are shown below.

Ink-jet recording methods include: (1) a so-called electrostatic suction method that includes applying a strong electric field between accelerating electrodes placed at nozzles and placed in front of the nozzles, continuously ejecting ink droplets from nozzles, and applying printing information signals to deflecting electrodes while the ink droplets pass between the deflecting electrodes so that an image can be recorded with the ink droplets flying toward and being fixed on a recording medium, or ejecting ink droplets from nozzles to a recording medium according to printing information signals without deflecting the ink droplets so that an image can be fixed and recorded on the recording medium; (2) a method that includes applying a pressure from a small pump to an ink liquid, while mechanically oscillating inkjet nozzles by means of a crystal resonator or the like, so that ink droplets are forced to be ejected from the nozzles, wherein the ink droplets ejected from the nozzles are charged at the same time, and applying printing information signals to deflecting electrodes while the ink droplets pass between the deflecting electrodes so that an image can be recorded with the ink droplets flying toward and being fixed on a recording medium; (3) a method (piezo) that includes applying a pressure and printing information signals at the same time from a piezoelectric element to an ink liquid to eject ink droplets from nozzles to a recording medium, so that an image is recorded on the recording medium; and (4) a method (BUBBLEJET(registered trademark)) that includes heating an ink liquid with micro-electrodes according to printing information signals to form ink bubbles and expanding the bubbles to eject the ink liquid from nozzles to a recording medium, so that an image is recorded on the recording medium.

Examples of the ink jet head include a shuttle system of performing recording using a serial head of a short length while scanning the head in the width direction of a recording medium and a line system using a line head in which recording elements are arranged corresponding to all the regions of one side of a recording medium. In the line system, image recording can be performed throughout the surface of the recording medium by scanning the recording medium in the direction orthogonal to the arrangement direction of the recording elements, and conveyance systems for scanning the short length head, such as a carriage, become unnecessary. Moreover, complicated scanning control of the movement of the carriage and the recording medium becomes unnecessary, and only the recording medium transfers. Thus, compared with the shuttle system, a recording rate can be increased. The ink jet recording method of the invention can be applied to the systems above. However, when applied to the line system in which dummy jet is not generally performed, ejection precision and scratch resistance of images are highly increased.

In the case of the line system, recording can be preferably carried out using not only one ink composition but two or more ink compositions by adjusting the interval between the ejection (droplet ejection) of the ink composition (the n-th color (n 1), e.g., a second color) to be ejected earlier and the ejection of the ink composition (the n+1 color, e.g., a 3rd color) to be ejected following the ink composition ejected earlier to 1 second or less in the aggregate formation process in the invention. In the invention, by adjusting the ejection interval to 1 second or less in the line system, images having excellent scratch resistance and reduced development of blocking can be obtained under higher speed recording more than before while preventing blur or color mixture of colors occurring due to interference between ink droplets. Moreover, images excellent in a hue and drawing properties (reproducibility of thin lines or fine portions in images) can be obtained.

In order to form high definition images, the amount of an ink droplet ejected from an ink-jet head is preferably from 0.5 μl to 6 μl (picoliters), more preferably from 1 μl to 5 μl, further preferably from 2 μl to 4 μl.

[Drying Process and Heat-Fixing Process]

It is preferable for the ink jet recording method of the invention to include, after the aggregate formation process, a drying process of drying the ink image formed by applying the ink composition and a heat-fixing process of bringing a heating member into contact with the image after drying for fixation. By performing the drying and heat-fixing treatment, the image on the recording medium is fixed, and the resistance against scratch of the image can be further increased.

The heating is preferably performed at a temperature higher than the minimum filming temperature (MFT) of the polymer particles in the image when the organic solvent contained in ink functions as a film formation auxiliary agent. Since the image is heated to a temperature higher than the minimum filming temperature (MFT), a film is formed to thereby strengthen the image. The heating temperature is preferably in a temperature region of MFT 10° C. or higher. Specifically, the heating temperature is preferably in the range of 40° C. to 150° C., more preferably 50° C. to 100° C., and still more preferably 60° C. to 90° C.

For surface smoothing, the pressure applied together with the heat is preferably in the range of from 0.1 MPa to 3.0 MPa, more preferably from 0.1 MPa to 1.0 MPa, and further preferably from 0.1 MPa to 0.5 MPa.

Preferable examples of the drying method include, but not particularly limited thereto, non-contact drying methods, such as a heating method by a heating element, such as a Nichrome wire heater, a method for supplying warmed air or hot air, or a heating method by a halogen lamp, an infrared lamp, or the like. Examples of the method of bringing the image surface into contact with the heating member include, but not particularly limited thereto, methods of performing heat fixation by contacting, such as a method for pressing a hot plate against the image formed side of the recording medium or a method of passing the recording medium between a pair of rollers or the like using a heating and pressurizing apparatus having a pair of heating and pressurizing rollers, a pair of heating and pressurizing belts, or a heating and pressurizing belt disposed at the image recording surface side of the recording medium and a holding roller arranged the opposite side.

When the image is fixed (heated and pressurized), a nip time is preferably 1 millisecond to 10 seconds, more preferably 2 milliseconds to 1 second, and still more preferably 4 milliseconds to 100 milliseconds. A preferable nip width is 0.1 mm to 100 mm, more preferably 0.5 mm to 50 mm, and still more preferably 1 mm to 10 mm.

The heating and pressurizing roller may be a metal roller made of metal or include a metal core and an elastic material coating layer provided around the core, and if necessary, a surface layer (also referred to as "release layer"). In the latter case, for example, the metal core may be a cylindrical member made of iron, aluminum, SUS, or the like, and at least part of the surface of the metal core is preferably covered with a coating layer. In particular, the coating layer is preferably made of a silicone resin or fluororesin having releasability. A heating element is preferably incorporated in the metal core of one of the heating and pressurizing rollers. The recording medium may be allowed to pass between the rollers so that heating and pressurizing can be performed at the same time, or if necessary, two heating rollers may be used to heat the recording medium between them. For example, the heating element is preferably a halogen lamp heater, a ceramic heater, a Nichrome wire heater, or the like.

The belt substrate to form the heating and pressurizing belt for use in the heating and pressurizing apparatus is preferably a seamless electroformed nickel substrate, and the thickness of the substrate is preferably from 10 μm to 100 μm. Besides nickel, aluminum, iron, polyethylene, or the like may also be used to form the belt substrate. When a silicone resin or fluororesin is used, the layer made of the resin preferably has a thickness of from 1 μm to 50 μm, more preferably from 10 μm to 30 μm.

The pressure (nip pressure) may be attained, for example, by selecting a resilient member such as a spring having a tension and disposing the resilient member on both roller ends of the heating and pressurizing rollers such that a desired nip pressure is obtained taking the nip gap into consideration.

The transporting speed of the recording medium in a case of using the heating and pressurizing roller or the heating and pressurizing belt is, preferably, in a range from 200 mm/sec to 700 mm/sec, more preferably, from 300 mm/sec to 650 mm/sec and, further preferably, from 400 mm/sec to 600 mm/sec.

<Recording Medium>

In the ink-jet recording method of the invention, the image is recorded on a recording medium.

The recording medium to be used may be, but not limited to, a sheet of cellulose-based general printing paper, such as so-called high-quality paper, coated paper, or art paper, for use in general offset printing. When cellulose-based general printing paper is used in image recording by general ink jet method with water-based ink, the ink may be absorbed and dried relatively slowly so that the color material may be more likely to migrate after the deposition, which may easily lead to image quality degradation. According to the ink-jet recording method of the invention, however, the migration of the color material can be suppressed so that high-quality image recording with good color density and hue can be achieved.

Generally commercially available recording media may be used as the recording medium, and examples of which include wood free paper (A) such as OK Prince High-Quality (trade name) manufactured by Oji paper Co., Ltd., Shiorai (trade name) manufactured by Nippon Paper Industries Co., Ltd. and New NPI High-Quality (trade name) manufactured by Nippon Paper Industries Co., Ltd.; lightly coated paper such as OK Ever Light Coat (trade name) manufactured by Oji paper Co., Ltd. and Aurora S (trade name) manufactured by Nippon Paper Industries Co., Ltd.; lightweight coated paper (A3) such as OK Coat L (trade name) manufactured by Oji paper Co., Ltd. and Aurora L (trade name) manufactured by Nippon Paper Industries Co., Ltd.; coated paper (A2, B2) such as OK Top Coat+(trade name) manufactured by Oji paper Co., Ltd. and Aurora Coat (trade name) manufactured by Nippon Paper Industries Co., Ltd.; and art paper (A1) such as OK Kanafuji+ (trade name) manufactured by Oji paper Co., Ltd. and Tokubishi Art (trade name) manufactured by Mitsubishi Papers Mills Ltd. Various types of photo paper for ink-jet recording may also be used.

In particular, the effect of suppressing color material migration should be relatively large, and high-quality images with better color intensity and hue than the conventional ones should be obtained. From this point of view, the recording medium preferably has a water absorption coefficient Ka of from $0.05$ $mL/m^2 \cdot ms^{1/2}$ to $0.5$ $mL/m^2 \cdot ms^{1/2}$, more preferably from $0.1$ $mL/m^2 \cdot ms^{1/2}$ to $0.4$ $mL/m^2 \cdot ms^{1/2}$, and further preferably from $0.2$ $mL/m^2 \cdot ms^{1/2}$ to $0.3$ $mL/m^2 19$ $ms^{1/2}$.

The water absorption coefficient Ka has the same meaning as that described in JAPAN TAPPI Paper and Pulp Test Method No. 51: 2000 (issued by Japan Technical Association of the Pulp and Paper Industry). Specifically, the absorption coefficient Ka may be determined by calculating the difference between the amounts of transfer of water at a contact time of 100 ms and a contact time of 900 ms each measured using an automatic scanning liquid absorption meter KM500Win (trade name, manufactured by Kumagai Riki Kogyo Co., Ltd.).

Among the recording medium, a coated paper sheet for use in general offset printing is particularly preferred. Coated paper is produced by applying a coating material to the surface of non-surface-treated cellulose-based general wood-free paper, neutralized paper or the like so that a coating layer can be formed thereon. In general image forming by water-based inkjet, coated paper may be more likely to cause problems with respect to quality such as image glossiness or scratch resistance. In the ink-jet recording method of the invention, however, uneven glossiness can be reduced, and images with good glossiness and scratch resistance can be obtained. In particular, coated paper including base paper and a coating layer containing kaolin and/or calcium bicarbonate is preferably used. More specifically, art paper, coated paper, lightweight coated paper, or lightly coated paper is more preferred.

EXAMPLES

The invention will be described in detail by way of examples but the invention is not limited to the following examples so long as they are within the gist of the invention. Unless otherwise specified, "part" is based on mass.

The weight average molecular weight was measured by gel permeation chromatography (GPC). In GPC, HLC-8220GPC (trade name, manufactured by Tosoh Corporation) was used, and 3 pieces of columns, TSKgel Super HZM-H, TSKgel Super HZ4000, and TSK gel SuperHZ 2000 connected in series (trade name, manufactured by Tosoh Corporation) were used as the column, and THF (tetrahydrofuran) was used as an eluate. Further, the measurement was performed by using an IR detector under the conditions at a sample concentration of 0.45% by mass, a flow rate of 0.35 mL/min, a sample ejection amount of 10 µL, and a measuring temperature of 40° C. A calibration curve was prepared based on eight samples of "standard sample TSK standard, polystyrene" of "F-40", "F-20", "F-4", "F-1", "A-5000", "A-2500", "A-1000", and "n-propylbenzene" manufactured by Tosoh Corporation.

Example 1

<Preparation of Ink Composition>
(Synthesis of Polymer Dispersant P-1)

Polymer dispersant P-1 was synthesized as shown below according to the following scheme:

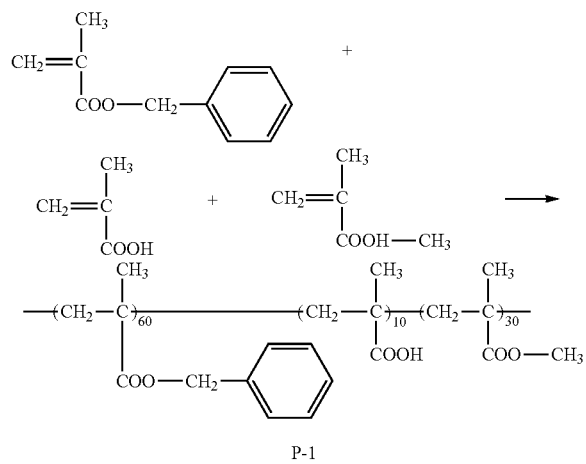

P-1

88 g of methyl ethyl ketone was put in a 1000 mL three-necked flask equipped with a stirrer and a cooling tube and heated to 72° C. in a nitrogen atmosphere, to which a solution in which 0.85 g of dimethyl 2,2'-azobisisobutyrate, 60 g of benzyl methacrylate, 10 g of methacrylic acid, and 30 g of methyl methacrylate were dissolved in 50 g of methyl ethyl ketone was added dropwise over 3 hr. After completing the dropwise addition and further allowing the mixture to react for 1 hr, a solution in which 0.42 g of dimethyl 2,2'-azobisisobutyrate was dissolved in 2 g of methyl ethyl ketone was added, and the temperature of the mixture was elevated to 78° C. and the mixture was heated at 78° C. for 4 hr. The obtained reaction solution was re-precipitated twice in a great excess of hexane and a precipitated resin was dried, thereby obtaining 96 g of a polymer dispersant P-1.

The composition of the obtained polymer dispersant P-1 was confirmed by $^1$H-NMR and the weight average molecular weight (Mw) determined by GPC was 44,600. Further, when an acid value was determined according to the method described in HS standards (JIS K0070:1992, the disclosure of which is incorporated by reference herein), the obtained resin was revealed having an acid value of 65.2 mgKOH/g.

(Preparation of Dispersion C of Resin-Coated Pigment Particles)

10 parts of pigment blue 15:3 (phthalocyanine blue A220 (trade name), manufactured by Dainichiseika Color & Chemicals Mfg. Co., Ltd; cyan pigment), 5 parts of the polymer dispersant P-1, 42 parts of methyl ethyl ketone, 5.5 parts of an aqueous 1N NaOH solution, and 87.2 parts of ion exchange water were mixed, and the mixture was dispersed for 2 hours to 6 hours using 0.1 mmɸ zirconia beads by means of a bead mill.

From the obtained dispersion, methyl ethyl ketone was removed at 55° C. under reduced pressure, and further water was partially removed. Then, the resultant was subjected to centrifugal treatment using a 50 mL centrifuging tube by means of a high-speed centrifugal cooler 7550 (manufactured by Kubota Seisakusho K.K.) at 8000 rpm for 30 minutes, thereby collecting the supernatant other than the precipitate. Thereafter, the pigment concentration was determined from the absorbance spectrum, thereby obtaining dispersion C (cyan dispersion C) of resin-coated pigment particles (pigment coated with a polymer dispersant) having a pigment concentration of 10.2% by mass.

(Preparation of Dispersion M of Resin-Coated Pigment Particles)

Dispersion M (magenta dispersion M) of resin-coated pigment particles (pigment coated with a polymer dispersant) was prepared in a similar to the process in the preparation of the dispersion C of resin-coated pigment particles, except using pigment red 122 (CROMOPHTAL Jet Magenta DMQ (trade name, manufactured by Tiba Specialty Chemicals; magenta pigment) in place of the pigment blue 15:3 (cyan pigment) in the preparation of the dispersion C of resin-coated pigment particles.

(Preparation of Dispersion Y of Resin-Coated Pigment Particles)

Dispersion Y (yellow dispersion Y) of resin-coated pigment particles (pigment coated with a polymer dispersant) was prepared in a similar to the process in the preparation of the dispersion C of resin-coated pigment particles, except using pigment yellow 74 (Irgalite Yellow GS (trade name), manufactured by Tiba Specialty Chemicals; yellow pigment) in place of the pigment blue 15:3 (cyan pigment) in the preparation of the dispersion C of resin-coated pigment particles.

(Preparation of Dispersion K of Resin-Coated Pigment Particles)

Dispersion K (black dispersion K) of resin-coated pigment particles (pigment covered with a polymer dispersant) was prepared in a similar to the process in the preparation of the dispersion C of resin-coated pigment particles, except using carbon black (NIPEX160-IQ (trade name), manufactured by Degussa; black pigment) in place of the pigment blue 15:3 (cyan pigment) in the preparation of the dispersion C of resin-coated pigment particles.

(Preparation of Self-Dispersing Polymer Particles)

Synthesis Example 1

In a 2 L three-neck flask equipped with a stirrer, a thermometer, a reflux condenser tube, and a nitrogen gas introducing tube, 360.0 g of methyl ethyl ketone was placed, and heated to 75° C. A mixture solution of 180 g of methyl methacrylate, 32.4 g of methoxyethyl acrylate, 126.0 g of benzyl methacrylate, 21.6 g of methacrylic acid, 72 g of methyl ethyl ketone, and 1.44 g of V-601 (trade name, manufactured by Wako Pure Chemical Industries, Ltd.) was added dropwise thereto at a constant velocity such that the addition could be completed in 2 hours. After the addition was completed, a solution of 0.72 g of V-601 and 36.0 g of methyl ethyl ketone was added and stirred at 75° C. for 2 hours. A solution of 0.72 g of V-601 and 36.0 g of methyl ethyl ketone was further added and stirred at 75° C. for 2 hours. The mixture was then heated to 85° C. and further stirred for 2 hours, so that a methyl methacrylate/methoxyethyl acrylate/benzyl methacrylate/methacrylic acid (50/9/35/6 in mass ratio) copolymer resin solution was obtained.

The weight average molecular weight (Mw) of the resulting copolymer was 66,000 (determined as a polystyrene-equivalent molecular weight by gel permeation chromatography (GPC)).

Next, 668.3 g of the obtained resin solution was weighed out, 388.3 g of isopropanol and 145.7 mL of aqueous 1 mol/L NaOH solution were added thereto, and the temperature inside the reaction vessel was elevated to 80° C. Next, 720.1 g of distilled water was added dropwise at a rate of 20 mL/min for water-based dispersion. Thereafter, the resultant was held at a temperature in the reaction vessel of 80° C. for 2 hours under atmospheric pressure, then at 85° C. for 2 hours, and then 90° C. for 2 hours. Then, the pressure in the reactor was reduced, and isopropanol, methyl ethyl ketone, and distilled water were distilled off in the total amount of 913.7 g, thereby obtaining water-based dispersion B-01Lx of self-dispersing polymer particles (B-01) having a solid content of 28.0%.

—Preparation of Ink Composition—

Using the dispersions of resin-coated pigment particles obtained above (cyan dispersion C, magenta dispersion M, yellow dispersion Y, and black dispersion K) and the dispersion B-01Lx of self-dispersing polymer particles (B-01), and each component was mixed so as to achieve the following ink composition, thereby preparing ink compositions. The obtained ink compositions were each charged in a plastic disposable syringe, and the resultant was filtered by a polyvinylidene fluoride (PVDF) filter having a pore size of 5 μm (Millex-SV (trade name), manufactured by Millipore Corp., 25 mm in diameter), thereby obtaining a finished ink.

(Composition of Cyan ink C1)

Cyan pigment (pigment blue 15:3): 4% by mass

Polymer dispersant P-1 mentioned above (in terms of solid content): 2% by mass

Water-based dispersion B-01Lx of self-dispersing polymer particles B-01 mentioned above: 4% by mass SUNNIX GP250 (trade name, manufactured by Sanyo Chemical Industries, Ltd., water-soluble organic solvent): 10% by mass Tripropylene glycol monoethyl ether (TPGmME) (manufactured by Wako Pure Chemical Ind., water-soluble organic solvent): 6% by mass OLFINE E1010 (trade name, manufactured by Nissin Chemical Industry Co., Ltd., surfactant): 1% by mass Ion exchange water was added to the components above so that the total amount was 100% by mass.

(Composition of Cyan Ink C2)

Cyan pigment (pigment blue 15:3): 4% by mass

Polymer dispersant P-1 mentioned above (in terms of solid content): 2% by mass

Water-based dispersion B-01Lx of self-dispersing polymer particles B-01 mentioned above: 4% by mass SUNNIX GP250 (trade name, manufactured by Sanyo Chemical Industries, Ltd., water-soluble organic solvent): 10% by mass Tripropylene glycol monoethyl ether (TPGmME) (manufactured by Wako Pure Chemical Ind., water-soluble organic solvent): 6% by mass OLFINE E1010 (trade name, Nissin Chemical Industry Co., Ltd., surfactant): 1% by mass 0.5 μm spherical silica matting agent (SEAHOSTAR KE-P50 (trade name): NIPPON SHOKUBAI CO., LTD., inorganic matting agent): 2% by mass Ion exchange water was added to the components above so that the total amount was 100% by mass.

(Composition of Cyan Ink C3)

The composition of cyan ink C3 was similar to that of the cyan ink C2, except that the inorganic matting agent in the composition of the cyan ink C2 was replaced by an organic matting agent (MP-1000 (trade name), manufactured by Soken Chemical & Engineering Co., Ltd. (PMMA polymer fine particles, average particle diameter of 0.4 μm, organic matting agent)).

(Composition of Cyan Ink C4)

The composition of cyan ink C4 was similar to that of the cyan ink C2, except replacing the inorganic matting agent in the composition of the cyan ink C2 was replaced by wax 1 (Carnauba wax (CELOZOLE 524 (trade name), manufactured by CHUKYO YUSHI Co., Ltd.), melting point of 83° C.).

(Composition of Cyan Ink C5)

The composition of cyan ink C5 was similar to that of the cyan ink C2, except that the inorganic matting agent in the composition of the cyan ink C2 was replaced by a wax 2 (prepared by the following preparation method.).

—Preparation method of Wax 2-60 g of microcrystalline wax (HI-MIC1090 (trade name), manufactured by NIPPON SEIRO CO., LTD., melting point of 88° C.) and 40 g of compound WA-2 (dispersant described in this description) were placed in a 2 L stainless steel disperser, and then heated to 100° C. and mixed, thereby obtaining a uniform and viscous mixture. 800 g of hot water having a temperature of 95° C. was added to the molten mixture, and the resultant was dispersed using a homogenizer (manufactured by NIPPON SEIKI CO., LTD., the number of revolution of 10000, for 10 minutes) at a high speed. The disperser was cooled while continuing stirring to gradually reduce the inner temperature, thereby obtaining wax 2 in the form of a solid state dispersion. The average particle size of the wax in the dispersion was 0.2 μm.

(Composition of Magenta Ink M1)

The composition of a magenta ink M1 was similar to that of the cyan ink C1, except that the cyan pigment in the composition of the cyan ink C1 was replaced by a magenta pigment (pigment red 122) so that the amount of the pigment was the same.

(Composition of Yellow Ink Y1)

The composition of yellow ink Y1 was similar to that of the cyan ink C1, except that the cyan pigment in the composition of the cyan ink C1 was replaced by a yellow pigment (pigment yellow 74) so that the amount of the pigment was the same.

(Composition of Black ink K1)

The composition of black ink K1 was similar to that of the cyan ink C1, except that the cyan pigment in the composition of the cyan ink C1 was replaced by a black pigment (carbon black) so that the amount of the pigment was the same.

The surface tension, viscosity, volume average particle diameter, and pH of each ink composition obtained above were measured. The obtained physical property values are shown in Table 1.

The measurement of the surface tension was performed at 25° C. using Automatic Surface Tensiometer CBVP-Z (trade name, manufactured by Kyowa Interface Science Co., LTD.) by Wilhelmy method employing a platinum plate.

The measurement of viscosity was performed at 30° C. using VISCOMETER TV-22 (trade name, manufactured by TOKI SANGYO CO., LTD).

The measurement of the volume average particle diameter of each ink composition was performed by diluting the obtained ink compositions to a concentration suitable for the measurement as appropriate and by using a ultrafine particle size distribution meter, NANO TRACK UPA-EX150 (trade name, manufactured by Nikkiso Co., Ltd.) under the same measurement conditions for each ink composition according to a dynamic light scattering method.

With respect to the pH, the pH of the ink composition in the form of an undiluted liquid was measured at 25° C. using a pH meter WM-50EG (trade name) manufactured by TOA ELECTRIC INDUSTRIAL CO., LTD.

<Preparation of Reaction Liquid>

Reaction liquid (1) was prepared as follows. The surface tension, viscosity, and pH were measured by substantially the same method as above.

—Preparation of Reaction Liquid (1)—

Each component was mixed so as to achieve the following composition, thereby preparing reaction liquid (1). The physical property values of the reaction liquid (1) were as follows: viscosity of 2.6 mPa·s, surface tension of 37.3 mN/m, and pH of 1.6.

<Composition of Reaction Liquid (1)>

Malonic acid (divalent carboxylic acid, manufactured by Wako Pure Chemical Ind. Ltd.) 15.0% by mass
Diethylene glycol monomethyl ether (manufactured by Wako Pure Chemical Ind. Ltd. Industry) 20.0% by mass
N-Oreoyl-N-methyltaurine sodium (surfactant) 1.0% by mass
Ion exchange water 64.0% by mass <Preparation of Ink Set>

(Preparation of Ink Set 1)

Ink set 1 was prepared using a combination of the ink compositions (cyan ink C1, magenta ink M1, yellow ink Y1, black ink K1) and the reaction liquid (1).

(Preparation of Ink Sets 2 to 5)

Ink sets 2 to 5 were obtained in a similar manner, except that the cyan ink C1, magenta ink M1, yellow ink Y1, and black ink K1 in the preparation of the ink set 1 were respectively replaced by the corresponding cyan inks C2 to C5, magenta inks M2 to M5, yellow inks Y2 to Y5, black inks K2 to K5 shown in Table 1.

<Image Recording and Evaluation>

As described below, images are recorded using the ink sets 1 to 5 as shown in Table 2 and the following evaluation was performed. The evaluation results are shown in Table 2.

—1. Image Quality (Droplet Ejection Interference)—

<A. Evaluation in the Case of Including No Heat-Fixing Process>

(a) A GEL JET GX5000 printer head (trade name, full line head, manufactured by Ricoh Co., Ltd.) was prepared, and storage tanks connected thereto ere each refilled with each of the cyan inks C1 to C5, magenta inks M1 to M5, yellow inks Y1 to Y5, and black inks K1 to K5 obtained above. As a recording medium, TOKUBISHI ART double-sided N paper (trade name, manufactured by Mitsubishi Paper Mills Ltd., water absorption coefficient $Ka=0.21$ $mL/m^2 \cdot ms^{1/2}$) was prepared.

(b) Then, the TOKUBISHI ART double-sided N paper was fixed on a stage movable at 500 mm/second in a given linear direction serving as a subscanning direction during recording. Then, the reaction liquid (1) obtained above was applied thereto so that the thickness was about 1.5 μm (equivalent to 0.34 $g/m^2$ of malonic acid) by a wire bar coater, and the resultant was dried for 2 seconds at 50° C. immediately after the application of the reaction liquid (1).

(c1) Thereafter, the GELJET GX5000 printer head was fixed so that the direction (main scanning direction) of the line head in which nozzles were arranged was inclined at an angle of 75.7° relative to the direction orthogonal to the direction of the movement (subscanning direction) of the stage in the same plane. Then, ink droplets were ejected by the line system while moving the recording medium in the subscanning direction at a constant rate under ejection conditions of the amount of ink droplets of 2.8 μL, an ejection frequency of 24 kHz, a resolution of 1200 dpi×1200 dpi, and a stage movement speed of 50 mm/s to print solid images, thereby obtaining evaluation samples. Immediately after the printing, the samples were dried at 60° C. for 3 seconds.

(d) Subsequently, the ink droplets were ejected while changing the stage movement speed to 100 mm/s, 250 mm/s, and 500 mm/s and changing the ejection frequency so that the droplet amount was the same as above, thereby separately preparing evaluation samples.

The obtained evaluation samples were visually observed with respect to the degrees of blur, color mixture of colors, or the like (droplet ejection interference) occurring between the ink droplets due to interference of the droplets by observing the uniformity of images, and the degrees are used as indices for evaluating high-speed aggregation properties. The aggregation rate was evaluated at a stage speed at which droplet ejection interference was no longer observed. The evaluation results are shown in Table 2.

<B. Evaluation in the Case of Including a Heat-Fixing Process>

Evaluation was carried out in a similar manner except adding the following process (c2) after the process (c1) in the process of <A. Evaluation in the case of including no heat-fixing process>.

(c2) Process

The recording medium was further made to pass through between a pair of fixing rollers heated to 60° C. or higher, and fixing treatment was carried out with a nip pressure of 0.25 MPa and a nip width of 4 mm, thereby obtaining evaluation samples.

The fixing rollers are constituted by a heating roller having an SUS cylindrical member as a core metal which is provided with a halogen lamp therein and whose core surface is covered with a silicone resin and an opposite roll that presses against the heating roller.

<C. Evaluation in the Case of Including a Process of Finish Coating an Inorganic Matting Agent>

Evaluation was carried out in a similar manner except adding the following process (c3) after the process (c1) in the process of <A. Evaluation in the case of including no heat-fixing process>.

Evaluation was carried out in a similar manner except adding the following process (c3) after the process (c1) and before the process (c2) in the process of <B. Evaluation in the case of including a heat-fixing process>.

(c3) Process

A liquid containing 15% by mass of 0.5 μm spherical silica matting agent (SEAHOSTAR KE-P50 (trade name): NIPPON SHOKUBAI CO., LTD.) and 85% by mass of ion exchange water was applied, by a wire bar coater, onto the recording medium to which the reaction liquid (1) had been applied so that the thickness was about 8.8 μm (equivalent to 2.0 g/m$^2$ of spherical silica matting agent), and, immediately after the application, the resultant was dried at 50° C. for 2 seconds.

<Evaluation Criteria>
A: Droplet ejection interference is not observed at 500 mm/s.
B: Droplet ejection interference is not observed at 250 mm/s.
C: Droplet ejection interference is not observed at 100 mm/s.
D: Droplet ejection interference is not observed at 50 mm/s.

—2. Paper Deformation—

A recording medium on which a solid image of cyan ink had been printed so that the ink coating amount was 5 g/m$^2$ was cut into 5 mm×50 mm, and allowed to stand for 24 hours under the conditions of (1) a temperature of 30° C. and a humidity of 80% RH or (2) a temperature of 25° C. and a humidity of 50% RH, thereby producing evaluation samples. The evaluation samples were observed with respect to the behavior of curl, and evaluated according to the following evaluation criteria while defining the curl values determined as follows as the index. The evaluation results are shown in Table 1.

—Measurement of Curl Value—

The sample cut into 5 mm×50 mm is placed on a curl measurement plate so that the curl occurs in the long side direction, and the curl value (curvature C) is read. More specifically, the curl is defined as the arc of a circle having a radius R, and then R is determined from the curl measurement plate, and the curl value (curvature C) is represented as follows.

$$C=1/R(m)$$

<Evaluation Criteria>
a: Curvature C is 20 or less.
b: Curvature C is more than 20 but 25 or less.
c: Curvature C is more than 25 but 30 or less.
d: Curvature C exceeds 30.

—3. Ejection Reliability—

A GEL JET GX5000 printer head (trade name, full line head, manufactured by Ricoh Co., Ltd.) was used, storage tanks connected thereto were each refilled with each of the corresponding cyan inks C1 to C5, magenta inks M1 to M5, yellow inks Y1 to Y5, and black inks K1 to K5 obtained above, and 96 lines were printed at a length of 10 cm at the amount of ink droplets of 3.5 μL, an ejection frequency of 24 kHz, and a resolution of a nozzle arrangement direction of 75 dpi×a transfer direction of 1200 dpi, thereby obtaining evaluation sample 1. As the recording medium, Kassai Photo Finish Pro (trade name, manufactured by Fuji Photo Film Co., Ltd.) was used. Then, the intervals between the 96 lines at a 5 cm portion from the droplet ejection initiation portion of the evaluation sample were measured using a dot analyzer DA-6000 (trade name, manufactured by Oji Scientific Instruments), and the standard deviation thereof was calculated (initial ejection stability).

Next, after printing was carried out in the preparation of the evaluation samples, the droplet ejection was ceased for 10 minutes under the environment of 25° C. and 55% RH while the printer head was held as it was. Then, printing was carried out under the same conditions, thereby producing an evaluation sample 2. The standard deviation of the intervals between the 96 lines at a 5 cm portion from the droplet ejection initiation portion of the evaluation sample 2 was calculated similarly as above, and the calculated value after the cessation was defined as the index for evaluating the ejection reliability.

In the evaluation above, the cyan inks were warmed in a 30° C. hot bath beforehand and then charged in the corresponding storage tanks connected to the printer head, and simultaneously the printer head was disposed on a thermostatic chamber in such a manner as to maintain an ejection temperature of 30° C., so that each of the inks can be ejected at an ejection temperature of 30° C. From the calculated standard deviation value after the cessation obtained as described above, the ejection reliability was evaluated according to the following evaluation criteria.

<Evaluation Criteria>
A: 3 μm or more but less than 4 μm
B: 4 μm or more but less than 5 μm
D: 5 μm or more —4. Scratch Resistance—

<A. Evaluation in the Case of Including No Heat-Fixing Process>

(a) A GEL JET GX5000 printer head (trade name, full line head, manufactured by Ricoh Co., Ltd.) was prepared, and storage tanks connected thereto were each refilled with each of the corresponding cyan inks C1 to C5, magenta inks M1 to M5, yellow inks Y1 to Y5, and black inks K1 to K5 obtained above. A TOKUBISHI ART double-sided N paper (trade name, manufactured by Mitsubishi Paper Mills Ltd.) as a recording medium was fixed on a stage movable at 500 mm/second in a given linear direction. Then, the reaction liquid (1) obtained above was applied thereto so that the thickness was about 1.5 μm (equivalent to 0.34 g/m$^2$ of malonic acid) by a wire bar coater, and the resultant was dried at 50° C. for 2 seconds immediately after the application of the reaction liquid (1).

(b) Thereafter, the GELJET GX5000 printer head (trade name, full line head, manufactured by Ricoh Co., Ltd.) was fixed so that the direction (main scanning direction) of the line head in which nozzles were arranged was inclined at an angle of 75.7° relative to the direction orthogonal to the direction of the movement (subscanning direction) of the stage. Then, ink droplets were ejected by the line system, while moving the recording medium in the subscanning direction at a constant rate, under ejection conditions of the amount of ink droplets of 3.5 μL, an ejection frequency of 24 kHz, and a resolution of 1200 dpi×600 dpi to print solid images, thereby obtaining evaluation samples. Immediately after the printing, the samples were dried at 60° C. for 3 seconds.

A non-printed TOKUBISHI ART double-sided N paper art cut into 10 mm×50 mm was wound around a paperweight (weight of 470 g, size of 15 mm×30 mm×120 mm) (area of a contact portion of the non-printed TOKUBISHI ART double-sided N and the evaluation sample: 150 mm$^2$), and then, using this, rubbed the evaluation samples produced above were each rubbed back and forth 3 times (equivalent to a load of 260 kg/m$^2$). The printed surfaces after rubbing were visually observed, and evaluated according to the following evaluation criteria.

<B. Evaluation in the Case of Including a Heat-Fixing Process>

Evaluation was carried out in a similar manner, except adding the following process (b2) after the process (b) in the process of <A. Evaluation in the case of including no heat-fixing process>.

(b2) Process

The recording medium was further made to pass through between a pair of fixing rollers heated to 60° C. or higher, and fixing treatment was carried out with a nip pressure of 0.25 MPa and a nip width of 4 mm, thereby obtaining evaluation samples.

The fixing rollers are constituted by a heating roller having an SUS cylindrical member as a core metal which is provided with a halogen lamp therein and whose surface is covered with a silicone resin and an opposite roll that presses against the heating roller.

<Evaluation in the Case of Including a Process of Finish Coating an Inorganic Matting Agent>

Evaluation was carried out in a similar manner except adding the following process (b3) after the process (b) in the process of <A. Evaluation in the case of including no heat-fixing process>.

Evaluation was carried out in a similar manner, except adding the following process (b3) after the process (b) and before the process (b2) in the process of <B. Evaluation in the case of including a heat-fixing process>.

(b3) Process

A liquid which contains 15% by mass of 0.5 μm spherical silica matting agent (SEAHOSTAR KE-P50 (trade name): NIPPON SHOKUBAI CO., LTD.) and whose total amount was adjusted by ion exchange water to 100% by mass was applied, by a wire bar coater, onto the recording medium to which the reaction liquid (1) was applied so that the thickness was about 8.8 μm (equivalent to 2.0 g/m² of spherical silica matting agent), and, immediately after the application, the resultant was dried at 50° C. for 2 seconds.

<Evaluation Criteria>

A: Separation of the image on the printed surface is not visually recognized at all.
B: Separation of the image on the printed surface is slightly visually recognized, but no problems in terms of practical use are caused.
D: Separation of the image on the printed surface is visually recognized, and problems in terms of practical use are caused.

—5. Heat-Fixing Transfer Properties—

In the evaluation of scratch resistance, evaluation in the case of including a heat-fixing process is performed. Then, the fixing roller was observed and stain on the fixing roller was visually observed.

<Evaluation Criteria> a: The image is not transferred to the fixing roller.
d: The image is transferred to the fixing roller.

—6. Image Glossiness (Surface Glossiness)—

A solid image was created in substantially the same manner as in the evaluation of the scratch resistance, and then the 60° specular gloss of the surface was measured by a gloss meter (IG-331 (trade name), manufactured by Horiba).

<Evaluation Criteria>

A: The glossiness of the solid image is 70% or more.
B: The glossiness of the solid image is 60% or more but less than 70%.
C: The glossiness of the solid image is 50% or more but less than 60%.

—7. Ground Glossiness—

The glossiness of untreated paper (recording medium) before the evaluation of ink jet image recording and the glossiness of a non-image portion to which no ink was ejected in each of the evaluation samples prepared for "3. Evaluation of ejection reliability" above were measured under the condition of an incidence angle of 60° using HORIBA GLOSS CHECKER IG-331, and evaluated according to the following evaluation criteria.

<Evaluation Criteria> a: Difference between the glossiness of the original paper and the glossiness of the ground portion after image recording is less than ±5%, and the texture of the original paper is maintained.

d: Difference between the glossiness of the original paper and the glossiness of the ground portion after image recording are ±5% or more, and the texture of the original paper is impaired.

TABLE 1

| Ink composition | Physical properties | | | |
| --- | --- | --- | --- | --- |
| | Surface tension | Viscosity | pH | Lubricant |
| Cyan ink C1 | 34.9 | 4.75 | 9.04 | None |
| Cyan ink C2 | 35.2 | 4.83 | 9.03 | Inorganic matting agent |
| Cyan ink C3 | 35.1 | 4.85 | 9.05 | Organic matting agent |
| Cyan ink C4 | 34.8 | 4.92 | 9.05 | Wax 1 |
| Cyan ink C5 | 35.0 | 4.90 | 9.04 | Wax 2 |
| Magenta ink M1 | 35.0 | 5.17 | 8.89 | None |
| Magenta ink M2 | 35.1 | 5.33 | 8.88 | Inorganic matting agent |
| Magenta ink M3 | 35.2 | 5.38 | 8.88 | Organic matting agent |
| Magenta ink M4 | 35.2 | 5.42 | 8.89 | Wax 1 |
| Magenta ink M5 | 35.1 | 5.43 | 8.89 | Wax 2 |
| Yellow ink Y1 | 35.6 | 4.52 | 8.75 | None |
| Yellow ink Y2 | 35.6 | 4.75 | 8.75 | Inorganic matting agent |
| Yellow ink Y3 | 35.5 | 4.77 | 8.77 | Organic matting agent |
| Yellow ink Y4 | 35.7 | 4.82 | 8.76 | Wax 1 |
| Yellow ink Y5 | 35.8 | 4.80 | 8.74 | Wax 2 |
| Black ink K1 | 35.2 | 4.04 | 8.80 | None |
| Black ink K2 | 35.3 | 4.20 | 8.82 | Inorganic matting agent |
| Black ink K3 | 35.1 | 4.23 | 8.81 | Organic matting agent |
| Black ink K4 | 35.4 | 4.35 | 8.79 | Wax 1 |
| Black ink K5 | 35.3 | 4.31 | 8.80 | Wax 2 |

TABLE 2

| | Ink set | | | Heat-fixing |
| --- | --- | --- | --- | --- |
| | | Lubricant (Ink composition) | Reaction liquid | process |
| 1 | Ink set 1 | None (C1, M1, Y1, K1) | Reaction liquid (1) | — |
| 2 | Ink set 1 | None (C1, M1, Y1, K1) | Reaction liquid (1) | Provided |
| 3 | Ink set 2 | Inorganic matting agent (C2, M2, Y2, K2) | Reaction liquid (1) | — |
| 4 | Ink set 2 | Inorganic matting agent (C2, M2, Y2, K2) | Reaction liquid (1) | Provided |
| 5 | Ink set 1 | Inorganic matting agent (separately applied) (C1, M1, Y1, K1) | Reaction liquid (1) | — |
| 6 | Ink set 1 | Inorganic matting agent (separately applied) (C1, M1, Y1, K1) | Reaction liquid (1) | Provided |
| 7 | Ink set 3 | Organic matting agent (C3, M3, Y3, K3) | Reaction liquid (1) | — |
| 8 | Ink set 3 | Organic matting agent (C3, M3, Y3, K3) | Reaction liquid (1) | Provided |
| 9 | Ink set 4 | Wax 1 (C4, M4, Y4, K4) | Reaction liquid (1) | — |

TABLE 2-continued

| | | | | |
|---|---|---|---|---|
| 10 | Ink set 4 | Wax 1 (C4, M4, Y4, K4) | Reaction liquid (1) | Provided |
| 11 | Ink set 5 | Wax 2 (C5, M5, Y5, K5) | Reaction liquid (1) | — |
| 12 | Ink set 5 | Wax 2 (C5, M5, Y5, K5) | Reaction liquid (1) | Provided |

Evaluation

| | Image quality (Droplet ejection interference) | Paper deformation | Ejection reliability | Scratch resistance | Heat-fixing transfer | Image glossiness | Ground glossiness | Remarks |
|---|---|---|---|---|---|---|---|---|
| 1 | B | c | D | D | — | C | a | Comparative example |
| 2 | B | d | D | B | d | C | a | Comparative example |
| 3 | B | a | B | B | — | C | a | Present invention |
| 4 | B | b | B | A | a | C | a | Present invention |
| 5 | B | a | D | B | — | C | d | Comparative example |
| 6 | B | b | D | A | a | C | d | Comparative example |
| 7 | B | a | B | B | — | C | a | Present invention |
| 8 | B | b | B | A | a | C | a | Present invention |
| 9 | B | a | A | B | — | B | a | Present invention |
| 10 | B | a | A | A | a | A | a | Present invention |
| 11 | B | a | A | B | — | B | a | Present invention |
| 12 | B | a | A | A | a | A | a | Present invention |

As shown in Table 2, in Examples having the constitution of the invention including the lubricant, ejection reliability is not impaired, paper deformation is suppressed, and images having excellent scratch resistance can be recorded.

The invention includes the following embodiments.

<1> An ink set for ink jet recording, comprising:
an ink composition containing a pigment, polymer particles, a water-soluble organic solvent, a lubricant, and water; and
a reaction liquid that forms an aggregate by contacting with the ink composition.

<2> The ink set for ink jet recording according to <1>, wherein the lubricant is at least one selected from a wax, a silicone compound, an ester compound, a fatty acid amide compound, a fluorine compound, a higher aliphatic acid, salts thereof, or an organic or inorganic matting agent.

<3> The ink set for ink jet recording according to <1>, wherein the lubricant is at least one selected from a wax of a straight chain higher fatty acid ester, a hydrocarbon wax, a silicone oil having a structure of —(—Si(CH$_3$)$_2$)$_n$— in which n is an integer of 1 or more, 1-pentadecyl-2-hexadecyl-phthalic acid diester, or palmitic acid amide.

<4> The ink set for ink jet recording according to <1>, wherein the lubricant is a wax.

<5> The ink set for ink jet recording according to <4>, wherein the lubricant is a wax emulsion.

<6> The ink set for ink jet recording according to <5>, wherein an average particle size of the lubricant is 0.1 μm to 2 μm.

<7> The ink set for ink jet recording according to <1>, wherein the lubricant is contained in the ink composition in a proportion of 0.1% by mass to 5% by mass in terms of solid matter concentration.

<8> The ink set for ink jet recording according to <1>, wherein the pigment is dispersed by a water-insoluble polymer.

<9> The ink set for ink jet recording according to <1>, wherein the polymer particles are self-dispersing polymer particles.

<10> The ink set for ink jet recording according to <9>, wherein the self-dispersing polymer particles contain a carboxy group.

<11> The ink set for ink jet recording according to <9>, wherein the self-dispersing polymer particles contain a constituent unit derived from an aromatic group-containing (meth)acrylate monomer, and the content thereof in the self-dispersing polymer particles is 10% by mass to 95% by mass.

<12> The ink set for ink jet recording according to <9>, wherein the self-dispersing polymer particles contain a water insoluble polymer having an acid value of 25 mgKOH/g to 100 mgKOH/g and a weight average molecular weight of 3,000 to 200,000.

<13> The ink set for ink jet recording according to <1>, wherein a glass transition temperature of a polymer of the polymer particles is from 20° C. to 200° C.

<14> An ink jet recording method comprising forming an image on a recording medium using the ink set for ink jet recording according to <1>.

<15> The ink jet recording method according to <14>, comprising, after the image formation process:
drying the image; and
bringing a surface of the image into contact with a heating member after drying to fix the image.

<16> The ink jet recording method according to <14>, wherein the image formation process comprises:
applying a reaction liquid on the recording medium; and applying the ink composition on the reaction liquid applied on the recording medium for contact therebetween to form an aggregate.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink set for ink jet recording, comprising:
   an ink composition containing a pigment, polymer particles, a water-soluble organic solvent, lubricant in the form of dispersed particles, and water;
   a reaction liquid that forms an aggregate by contacting with the ink composition, and
   the lubricant in the form of dispersed particles comprising 25% by mass to 99% by mass of a lubricant and 1% by mass to 75% by mass of a dispersant represented by the following formula (1):

$(R^3)a\text{-}G\text{-}(D)d$ 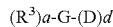 Formula (1)

wherein in Formula (1), $R^3$ is a substituted or unsubstituted alkyl group, alkenyl group, aralkyl group, or aryl group having 10 to 60 carbon atoms; G represents a linking group having a valency of 2 to 7; D is (B)n-E, wherein B represents —$CH_2CH_2O$—, —$CH_2CH_2CH_2O$—, —$CH(CH_3)CH_2O$—, or —$CH_2CH(OH)CH_2O$—, and n is an integer of 1 to 50; E represents hydrogen, or a substituted or unsubstituted alkyl group, aryl group, alkyl carbonyl group, or aryl carbonyl group having 1 to 8 carbon atoms; a and d each represent an integer of 1 to 6; plural $R^3$s, D, and E may be the same or different from each other.

2. The ink set for ink jet recording according to claim 1, wherein the lubricant is at least one selected from a wax, a silicone compound, an ester compound, a fatty acid amide compound, a fluorine compound, a higher aliphatic acid, salts thereof, or an organic or inorganic matting agent.

3. The ink set for ink jet recording according to claim 1, wherein the lubricant is at least one selected from a wax of a straight chain higher fatty acid ester, a hydrocarbon wax, a silicone oil having a structure of —(—$Si(CH_3)_2$)n- in which n is an integer of 1 or more, 1-pentadecyl-2-hexadecyl-phthalic acid diester, or palmitic acid amide.

4. The ink set for ink jet recording according to claim 1, wherein the lubricant is a wax.

5. The ink set for ink jet recording according to claim 4, wherein the lubricant is a wax emulsion.

6. The ink set for ink jet recording according to claim 5, wherein an average particle size of the lubricant is 0.1 μm to 2 μm.

7. The ink set for ink jet recording according to claim 1, wherein the lubricant is contained in the ink composition in a proportion of 0.1% by mass to 5% by mass in terms of solid matter concentration.

8. The ink set for ink jet recording according to claim 1, wherein the pigment is dispersed by a water-insoluble polymer.

9. The ink set for ink jet recording according to claim 1, wherein the polymer particles are self-dispersing polymer particles.

10. The ink set for ink jet recording according to claim 9, wherein the self-dispersing polymer particles contain a carboxy group.

11. The ink set for ink jet recording according to claim 9, wherein the self-dispersing polymer particles contain a water insoluble polymer having an acid value of 25 mgKOH/g to 100 mgKOH/g and a weight average molecular weight of 3,000 to 200,000.

12. The ink set for ink jet recording according to claim 1, wherein a glass transition temperature of a polymer of the polymer particles is from 20° C. to 200° C.

* * * * *